United States Patent
Park et al.

(10) Patent No.: US 12,493,439 B2
(45) Date of Patent: Dec. 9, 2025

(54) ELECTRONIC DEVICE AND METHOD FOR EXECUTING APPLICATION USING BOTH DISPLAY OF ELECTRONIC DEVICE AND EXTERNAL DISPLAY

(71) Applicant: SAMSUNG ELECTRONICS CO., LTD., Suwon-si (KR)

(72) Inventors: Kyungbae Park, Suwon-si (KR); Hyewon Koo, Suwon-si (KR); Minchul Kim, Suwon-si (KR); Minseok Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 17/747,450

(22) Filed: May 18, 2022

(65) Prior Publication Data
US 2022/0276820 A1  Sep. 1, 2022

Related U.S. Application Data

(63) Continuation of application No. 16/527,892, filed on Jul. 31, 2019, now abandoned.

(30) Foreign Application Priority Data

Jul. 31, 2018  (KR) .................. 10-2018-0089606

(51) Int. Cl.
*G06F 3/14* (2006.01)
*G06F 3/04845* (2022.01)
(Continued)

(52) U.S. Cl.
CPC ........ *G06F 3/1431* (2013.01); *G06F 3/04845* (2013.01); *G06F 3/0486* (2013.01); *G06F 3/04883* (2013.01)

(58) Field of Classification Search
CPC .... G06F 3/1431; G06F 3/142; G06F 3/04845; G06F 3/0486; G06F 3/04883;
(Continued)

(56) References Cited

U.S. PATENT DOCUMENTS 5,250,929 A  10/1993  Hoffman
5,818,425 A  10/1998  Want
(Continued)

FOREIGN PATENT DOCUMENTS

JP         4995056        8/2012
KR      1020160031724    3/2016
KR     10-2017-0096408 A  8/2017

OTHER PUBLICATIONS

Indian Examination Report dated May 11, 2021 issued in counterpart application No. 201944030866, 7 pages.
(Continued)

*Primary Examiner* — Tan H Tran
(74) *Attorney, Agent, or Firm* — Sughrue Mion, PLLC

(57) ABSTRACT

An electronic device is provided. The electronic device includes a first display, a memory configured to store an application, and a processor configured to while executing the application, in response to a connection between a second display different from the first display and the electronic device, output a first user interface and a visual object which is displayed on the first user interface and is related to the second display in the first display, by using the application, in response to a first input of a user related to the visual object, identify a second user interface by using the application, while outputting the first user interface in the first display, output the identified second user interface in the second display, and in response to a second input of the user on the first user interface, change a display state of the first user interface.

20 Claims, 39 Drawing Sheets

(51) Int. Cl.
*G06F 3/0486* (2013.01)
*G06F 3/04883* (2022.01)

(58) Field of Classification Search
CPC .... G06F 3/0488; G06F 3/0481; G06F 3/1423; G06F 3/1438; G06F 2203/04806; G09G 5/12; G09G 2370/12; G09G 2340/045
See application file for complete search history.

(56) References Cited

U.S. PATENT DOCUMENTS

| | | | |
|---|---|---|---|
| 7,523,402 B2* | 4/2009 | Kunisada | G06F 3/1423 715/761 |
| 8,063,890 B2 | 11/2011 | Fleck | |
| 8,117,554 B1 | 2/2012 | Grechishkin | |
| 9,612,719 B2* | 4/2017 | Kim | G06F 3/0482 |
| 9,880,734 B2 | 1/2018 | Sliger | |
| 9,940,087 B2 | 4/2018 | Son et al. | |
| 10,365,879 B2* | 7/2019 | Lee | G09G 5/12 |
| 10,430,141 B2 | 10/2019 | Jeong | |
| 10,866,778 B2* | 12/2020 | Mouyade | G06F 3/1454 |
| 2003/0229900 A1* | 12/2003 | Reisman | H04N 21/4755 348/E7.071 |
| 2005/0015731 A1 | 1/2005 | Mak | |
| 2010/0011285 A1 | 1/2010 | Kawata | |
| 2011/0090234 A1* | 4/2011 | Bolcsfoldi | G09F 9/35 345/536 |
| 2011/0283334 A1* | 11/2011 | Choi | H04L 67/148 725/148 |
| 2011/0304557 A1* | 12/2011 | Wilburn | G06F 3/0488 715/702 |
| 2012/0038679 A1 | 2/2012 | Yun | |
| 2012/0084793 A1 | 4/2012 | Reeves | |
| 2013/0027404 A1 | 1/2013 | Sarnoff | |
| 2013/0050230 A1 | 2/2013 | Jeong et al. | |
| 2014/0009394 A1* | 1/2014 | Lee | H04N 21/41407 345/157 |
| 2014/0068520 A1* | 3/2014 | Missig | G09G 5/12 715/841 |
| 2014/0359493 A1 | 12/2014 | Hong | |
| 2015/0015508 A1* | 1/2015 | Song | G06F 3/041 715/740 |
| 2015/0061971 A1* | 3/2015 | Choi | G06F 3/1454 345/2.3 |
| 2015/0077635 A1 | 3/2015 | Wu | |
| 2015/0339005 A1 | 11/2015 | Li | |
| 2016/0011841 A1 | 1/2016 | Lee | |
| 2016/0103648 A1 | 4/2016 | Reevers | |
| 2016/0306511 A1 | 10/2016 | Park | |
| 2017/0199750 A1* | 7/2017 | Reuschel | G06F 3/041 |
| 2017/0228137 A1 | 8/2017 | Carlos et al. | |
| 2017/0235435 A1 | 8/2017 | Sohn et al. | |
| 2018/0307456 A1 | 10/2018 | Sirpal | |
| 2020/0213438 A1 | 7/2020 | Liu | |
| 2021/0072846 A1 | 3/2021 | Jang | |
| 2021/0099564 A1 | 4/2021 | Lee | |
| 2022/0321629 A1* | 10/2022 | Teng | H04L 65/612 |

OTHER PUBLICATIONS

European Search Report dated Feb. 17, 2021 issued in counterpart application No. 19189440.1-1203, 5 pages.
Nadel, Brian, Tom's Guide, "A Month with the Note 8: Can Samsung's Phablet Replace a Laptop?", Oct. 1, 2017, pp. 12 https://www.tomsguide.com/us/note-8-as-laptop-replacement,review-4720.html.
Cervantes, Edgar, "Using Samsung DeX as a PC for a week—can you really leave your computer behind?", Aug. 29, 2017, pp. 10, https://www.androidauthority.com/samsung-dex-pc-replacement-778222/.
Seifert, Dan, "Samsung DexX review: the closest thing we have to using our phones as PCs", May 2, 2017, pp. 4, https://www.theverge.com/2017/5/2/15495036/samsung-dex-station-galaxy-s8-review-desktop-dock.
European Search Report dated Jan. 13, 2020 issued in counterpart application No. 19189440.1-1203, 9 pages.
Communication issued Mar. 21, 2023 by Korean Intellectual Property Office in Korean Application No. 10-2018-0089606.
Office Action dated Sep. 25, 2023, issued by Korean Patent Office in Korean Patent Application No. 10-2018-0089606.
Communication dated May 27, 2024, issued by the Korean Patent Office in Korean Application No. 10-2018-0089606.

* cited by examiner

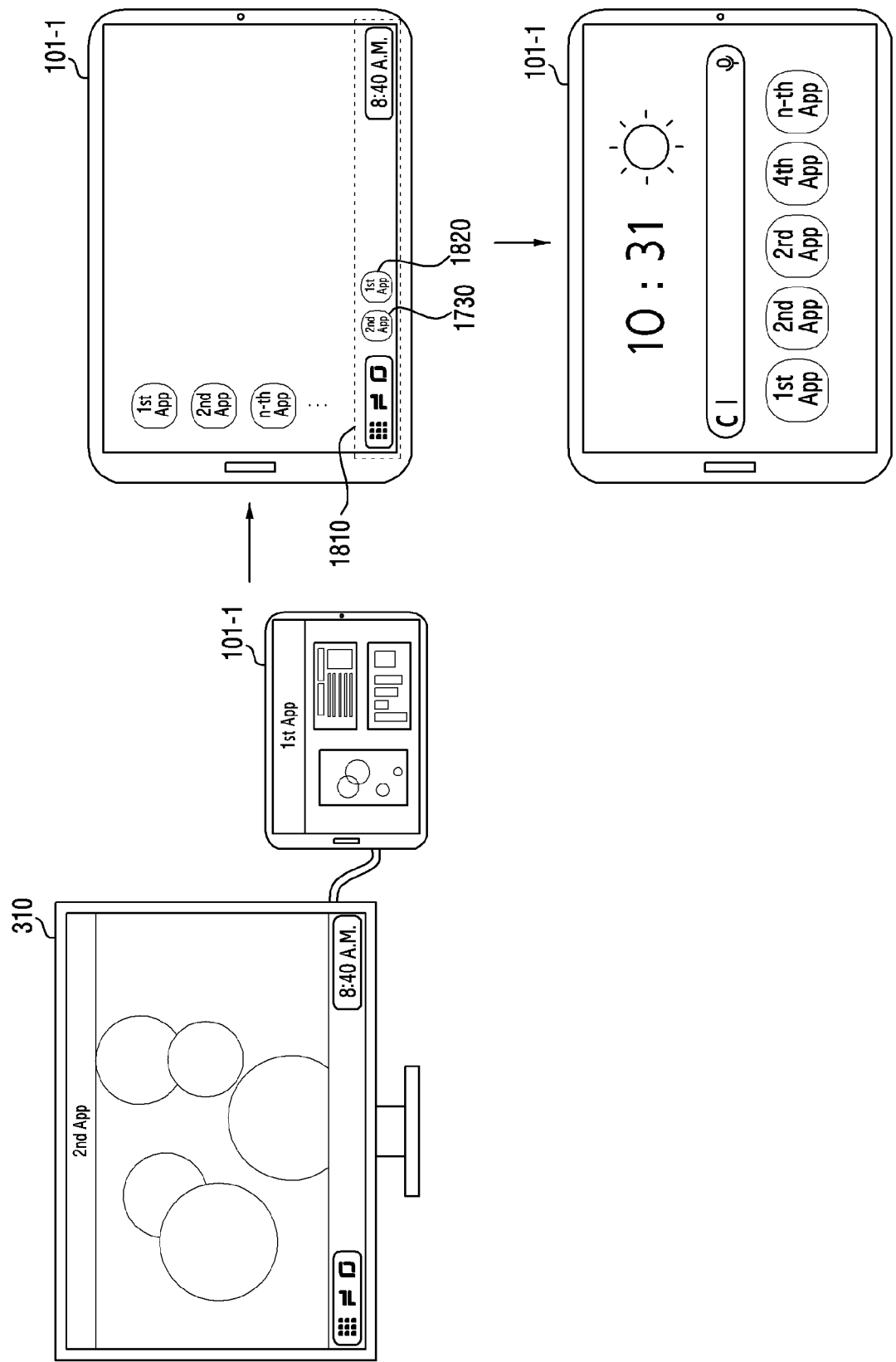

ELECTRONIC DEVICE AND METHOD FOR EXECUTING APPLICATION USING BOTH DISPLAY OF ELECTRONIC DEVICE AND EXTERNAL DISPLAY

CROSS-REFERENCE TO RELATED APPLICATION(S)

This application is continuation application of U.S. patent application Ser. No. 16/527,892, filed Jul. 31, 2019, which is based on and claims priority under 35 U.S.C. § 119 to Korean Patent Application Serial No. 10-2018-0089606, filed on Jul. 31, 2018, in the Korean Intellectual Property Office, the disclosures of which are incorporated herein in their entirety by reference.

BACKGROUND

1. Field

The present disclosure relates generally to an electronic device for executing an application in both a display of the electronic device and an external display, and a method thereof.

2. Description of Related Art

With the enhancement of digital technology, electronic devices which are able to communicate and/or process information while having mobility, such as mobile communication terminals, personal digital assistants (PDAs), electronic schedulers, smartphones, tablet personal computers (PCs), or wearable devices, are widely distributed. Such an electronic device may provide various services such as taking a picture, navigating, or providing a web interface, in addition to services such as a voice call, texting, or the like.

As accessibility to content such as photos or videos increases due to the development of communication technology, various technologies to share such content are developing. For example, electronic devices provided with screen sharing technology to display a screen related to a current electronic device on another electronic device are being developed.

When an electronic device such as a smartphone or a smart pad is connected with an external display, an image outputted on a display of the electronic device may be duplicated as it is and may be outputted on the external display. Accordingly, when the display of the electronic device and the external display are different from each other, for example, in their sizes or aspect ratios, an image outputted on the external display may be distorted.

Since the image outputted on the display of the electronic device is duplicated as it is on the external display, a user of the electronic device may not utilize the external display and the display of the electronic device for different purposes. Multitasking for executing different applications on the external display and the display of the electronic device may not be supported by the electronic device

SUMMARY

The present disclosure has been made to address at least the disadvantages described above and to provide at least the advantages described below.

In accordance with an aspect of the present disclosure, an electronic device is provided. The electronic device includes a first display, a memory configured to store an application, and a processor operatively coupled to the first display and the memory. The processor is configured to while executing the application, in response to a connection between a second display different from the first display and the electronic device, output a first user interface and a visual object which is displayed on the first user interface and is related to the second display in the first display, by using the application, in response to a first input of a user related to the visual object, identify a second user interface by using the application, while outputting the first user interface in the first display, output the identified second user interface in the second display, and in response to a second input of the user on the first user interface, change a display state of the first user interface. A display state of the second user interface is maintained independently from reception of the second input.

In accordance with an aspect of the present disclosure, an electronic device is provided. The electronic device includes a first display, a touch sensor disposed on a surface of the first display, and a processor operatively coupled to the first display and the touch sensor. The processor is configured to display a part of a multimedia content on the first display at a first magnification by using an application executed by the processor, in response to a connection between a second display different from the first display and the electronic device, display the multimedia content on the second display at a second magnification different from the first magnification by using the application, in response to a drag input on a part of the multimedia content displayed on the first display at the first magnification being received, display a path of the drag input in the part of the multimedia content displayed at the first magnification, and display the path of the drag input in the multimedia content displayed at the second magnification.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 18B is a diagram of another example in which the electronic device adjusts the UI of the one or more running applications in response to the connection with the external display, according to an embodiment;

DETAILED DESCRIPTION

Figure 1:
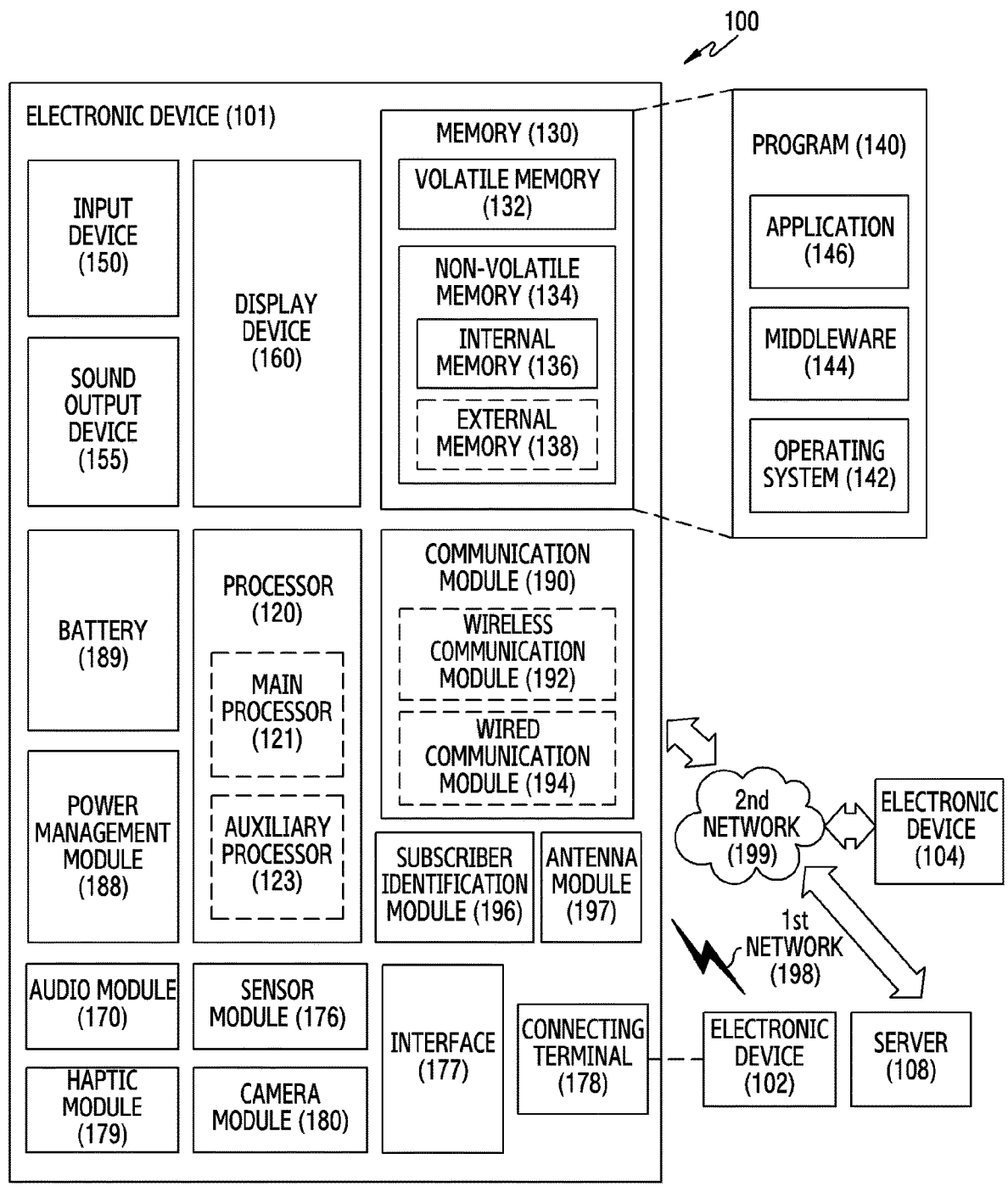
FIG. 1 is a diagram of an electronic device in a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
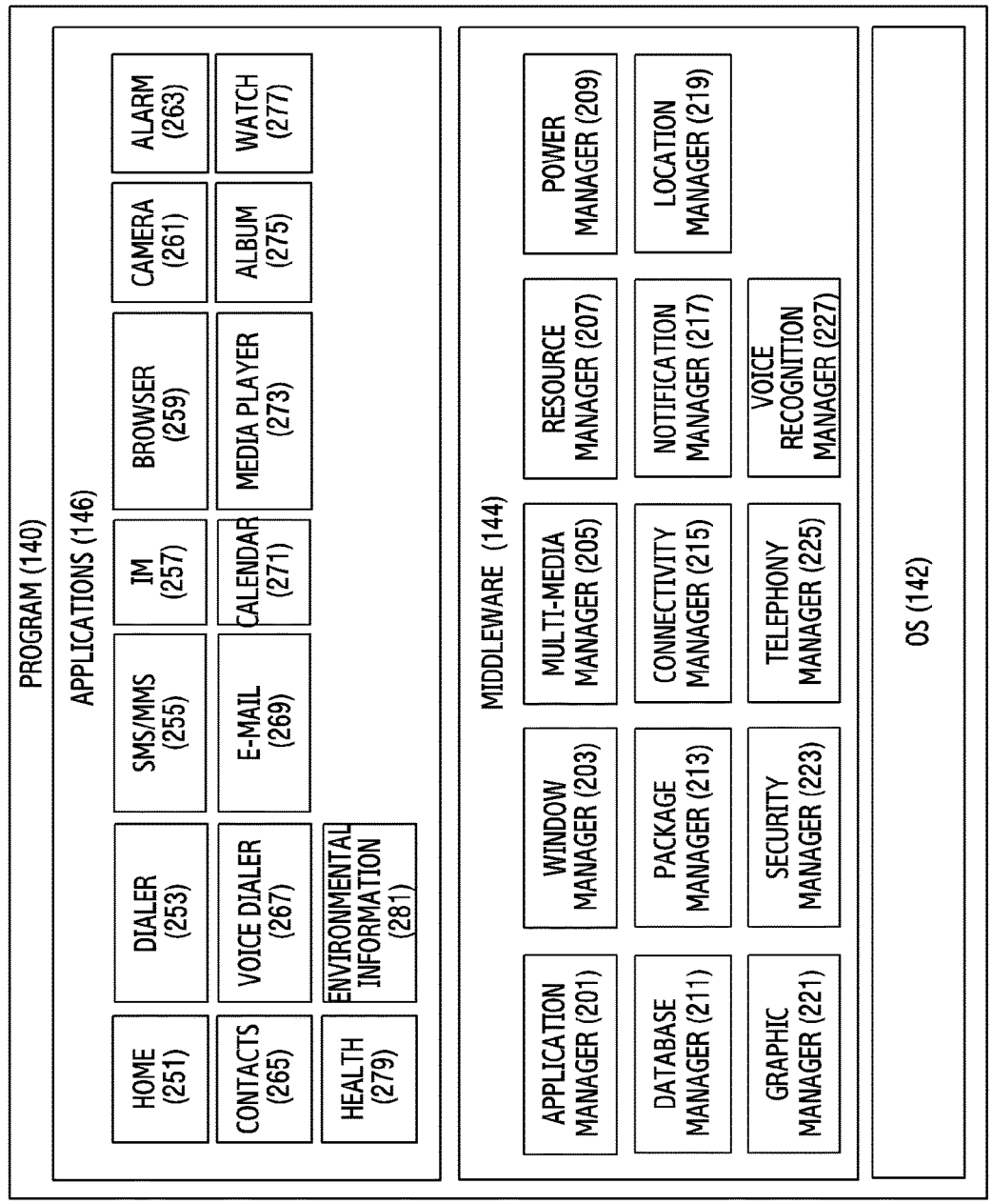
FIG. 2 is a diagram of a program, according to an embodiment.

FIG. 2 is a diagram 200 of the program 140, according to an embodiment. The program 140 can include the OS 142 for controlling one or more resources relating to the electronic device 101, the middleware 144, or the application 146 running on the OS 142. The OS 142 can include, for example, Android™, iOS™, Windows™, Symbian™, Tizen™, or Bada™. At least part of the program 140 can be preloaded on an electronic device or can be downloaded from an external electronic device (e.g., the electronic device 102, 104, or the server 108).

The OS 142 can control a management (e.g., allocation or retrieval) of one or more system resources (e.g., process, memory, or power). Alternatively or additionally, the OS 142 can include one or more driver programs for driving another hardware device of the electronic device 101 (e.g., the input device 150, the sound output device 155, the display device 160, the audio module 170, the sensor module 176, the interface 177, the haptic module 179, the camera module 180, the power management module 188, the battery 189, the communication module 190, the SIM 196, or the antenna module 197).

The middleware 144 can provide various functions to the application 146 in order to allow the application 146 to efficiently use a function or information provided from one or more resources. The middleware 144 includes at least one of an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manage 227.

The application manager 201 can manage the life cycle of the application 146. The window manager 203 can manage a GUI resource used in a screen. The multimedia manager 205 can recognize a format for playing various media files and encode or decode a media file by using the codec in a corresponding format. The resource manager 207 can manage a source code of the application 146 or a memory space of the memory 130. The power manager 209 can manage the capacity, temperature or power of the battery 189 and provide power information for an operation of the electronic device. The power manager 209 can operate together with a basic input/output system (BIOS).

The database manager 211 can create, search, or modify a database used in the application 146. The package manager 213 can manage installation or updating of an application distributed in a package file format. The connectivity manager 215 can manage a wireless connection or a direct connection with an external electronic device. The notification manager 217 can provide an event, such as incoming messages, appointments, and proximity alerts, to the user. The location manager 219 can manage location information of an electronic device. The graphic manager 211 can manage a graphic effect to be provided to the user or a user interface relating thereto.

The security manager 223 can provide system security or user authentication. The telephony manager 225 can manage a voice or video call function of the electronic device, The voice recognition manage 227 can transmit voice data of the user to the server 108, and receive a command corresponding to a function which the electronic device performs based on the voice data, or text data transformed based on the voice data. The middleware 144 can dynamically delete part of the existing components or add new components. At least a portion of the middleware 144 can be included in a portion of the OS 142 or can be implemented by another software different from the OS 142.

The application 146 can include at least one of a home 251, a dialer 253, an SMS/multimedia messaging system (MMS) 255, an instant message (IM) 257, a browser 259, a camera 261, an alarm 263, a contact 265, a voice dialer 267, an e-mail 269, a calendar 271, a media player 273, an album 275, a watch 277, health 279 (e.g., measure an exercise amount or blood sugar level), or environmental information 281 (e.g., air pressure, humidity, or temperature information) application. The application 146 can include an information exchange application for supporting information exchange between the electronic device and an external electronic device. The information exchange application can include a notification relay application for relaying specific information to the external device or a device management application for managing the external electronic device. The notification relay application can relay notification information from another application of the electronic device to an external electronic device, or receive and forward notification information from an external electronic device to the user.

The device management application can install, delete, or update a function (e.g., turn-on/turn off of the external electronic device itself (or some components) or display brightness (or resolution) adjustment) of an external electronic device communicating with the electronic device, or an application operating in the external electronic device.

Figure 3A:
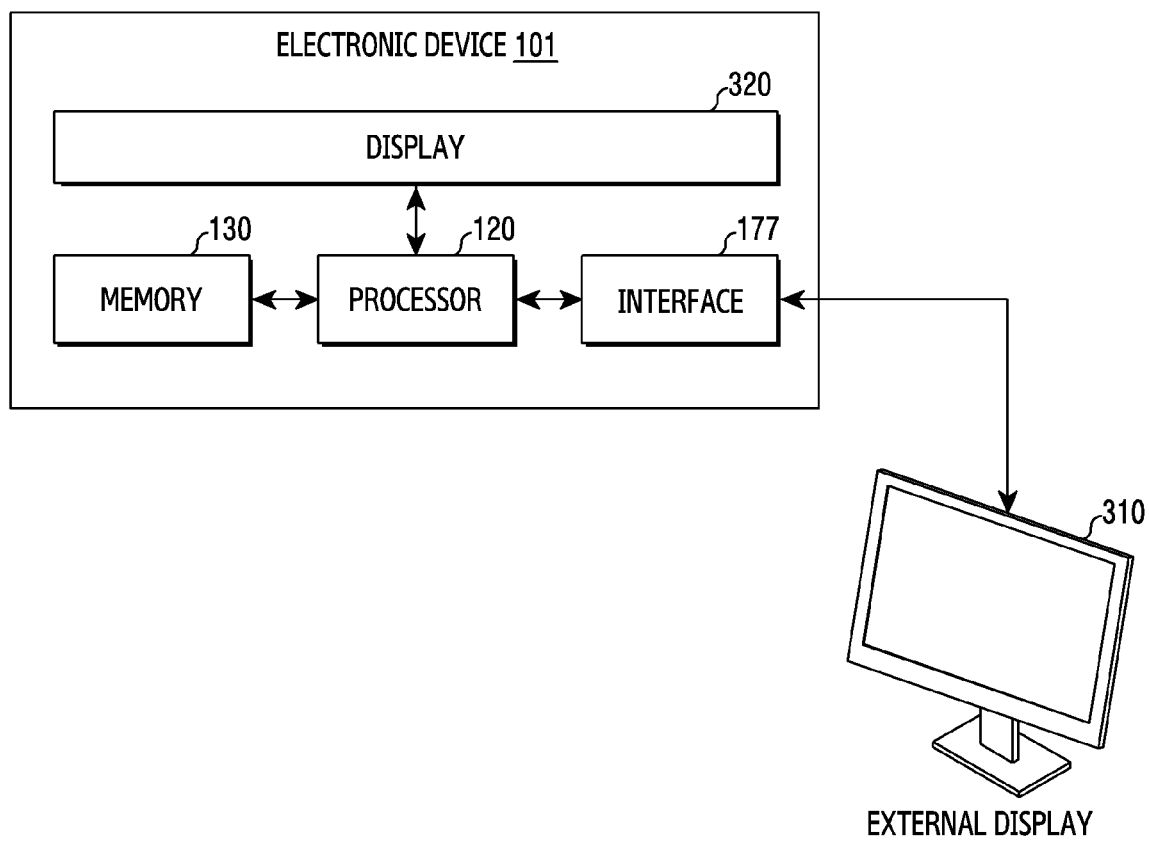
FIG. 3A is a diagram of an electronic device and external display, according to an embodiment.
Figure 3B:
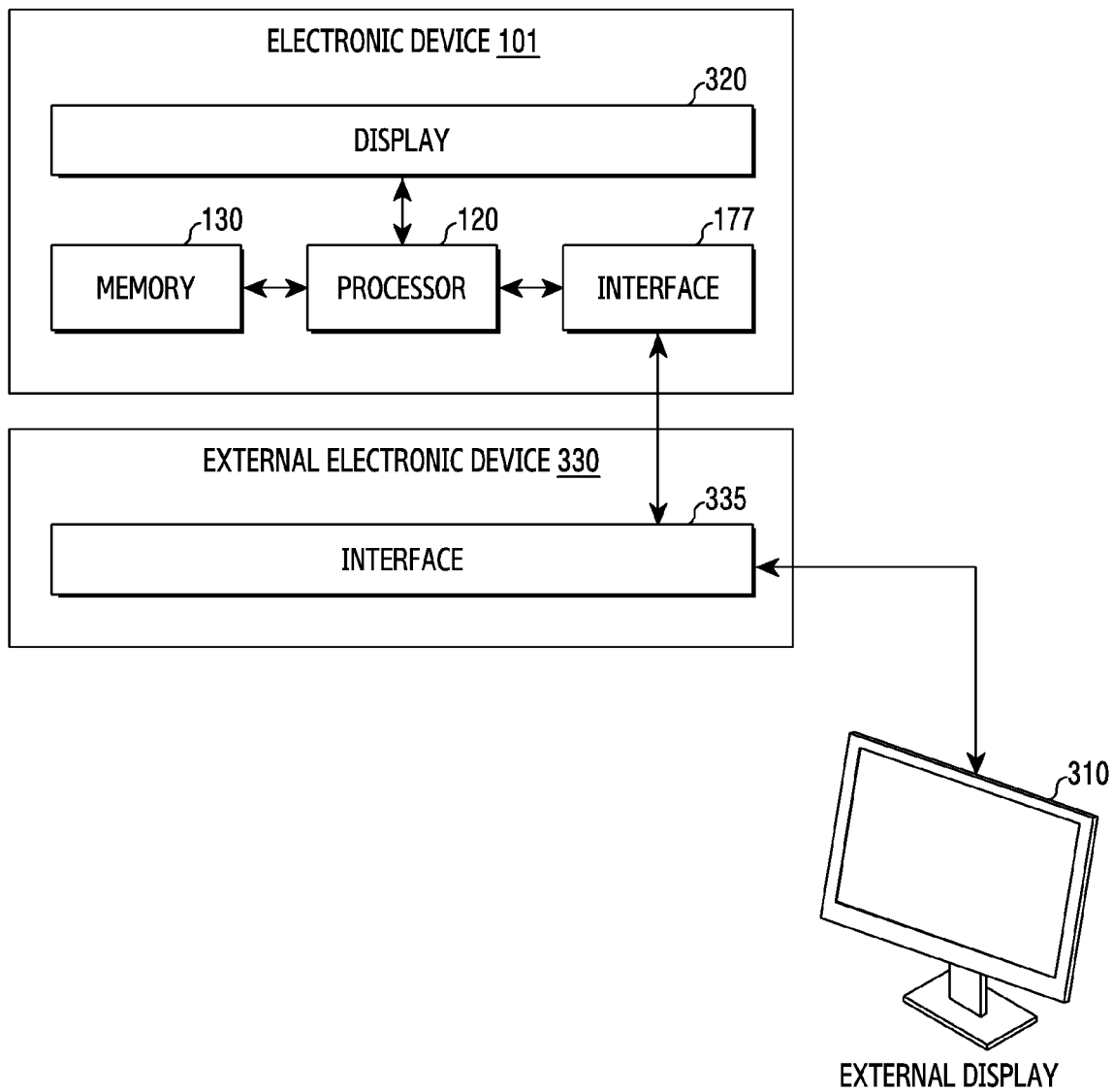
FIG. 3B is a diagram of an electronic device and an external display, according to an embodiment.

FIG. 3A is a diagram of an electronic device and external display, according to an embodiment, and FIG. 3B is a diagram of an electronic device and an external display, according to an embodiment. The electronic device 101 and elements included in the electronic device 101 in FIGS. 3A and 3B may correspond to the electronic device 101 and the elements included in the electronic device 101 of FIG. 1. The electronic device 101 may correspond to any one of a smartphone, a smart pad, a tablet PC, and a PDA. The electronic device 101 may be designed to allow a user to easily carry the electronic device 101.

Referring to FIGS. 3A and 3B, the electronic device 101 may include a processor 120. The processor 120 may calculate data by using one or more instructions. The processor 120 may include at least one of an arithmetic logical unit (ALU), a field programmable gate array (FPGA), an integrated circuit (IC), and a large scale integration (LSI) which are used to calculate data.

Referring to FIGS. 3A and 3B, the electronic device 101 may include a memory 130 storing one or more applications or data which may be executed by the processor 120. The memory 130 may include at least one of a volatile memory or a nonvolatile memory used by the electronic device 101. The volatile memory may correspond to a static random access memory (SRAM) or a dynamic RAM (DRAM). Data stored in the nonvolatile memory may not be deleted even when power supplied to the electronic device 101 is stopped. The nonvolatile memory may correspond not only to a magnetoresistive RAM (MRAM), a spin-transfer torque MRAM (STT-MRAM), a phase-change RAM (PRAM), a resistive RAM (RRAM), a ferroelectric RAM (FeRAM), but also to a flash memory, an embedded multi media card (eMMC), a solid state drive (SSD).

The memory 120 may store an instruction related to an application and an instruction related to an OS. The OS refers to system software executed by the processor 120. The electronic device 101 may manage hardware components included in the electronic device 101 by executing the OS. The OS may provide an application programming interface (API) to an application which is software other than system software.

The electronic device 120 may include a display 320 which is controlled by the processor 120 to visually provide UI to a user. The display 320 may correspond at least a part of the display device 160 of FIG. 1. The display 320 may have at least a part exposed to the outside through a housing of the electronic device 101. The display 320 may visually output information to the user by using at least one of an organic light emitting diode (OLED), a liquid crystal display (LCD), and a light emitting diode (LED).

A UI outputted through the display 320 may be generated by an application which is executed in the processor 120. The electronic device 101 may include a touch screen panel (TSP) disposed on the display 320 to allow the user to intuitively control the UI outputted through the display 320. The touch screen panel may detect a position of an object (e.g., a user's finger, a stylus) which touches the display 320 or hovers above the display 320 by using at least one of a resistive film, a capacitive component, a surface acoustic wave, and infrared rays.

Referring to FIGS. 3A and 3B, the electronic device 101 may be directly connected with an external electronic device (e.g., the external display 310) through an interface 177. The interface 177 may include an HDMI, a USB interface. The processor 120, the memory 130, the display 320, and the interface 177 may be operatively coupled to one another. The processor 120, the memory 130, the display 320, and the interface 177 may be electrically connected with one another by a communication bus.

The external display 310 may visually output information to a user by using at least one of an OLED, an LCD, and an LED. The external display 310 may include a display driver IC (DDI) for controlling pixels constituted by using at least one of an OLED, an LCD, and an LED. The external display 310 or the DDI may be directly controlled by the processor 120 of the electronic device 101. The DDI of the external display 310 may control the respective pixels based on information corresponding to a UI generated in the processor 120 of the electronic device 101.

Referring to FIG. 3B, the electronic device 101 and the external display 310 may be connected with each other by an external electronic device 330. The external electronic device 330 may include an interface 335 relaying a flow of an electric signal between the electronic device 101 and the external display 310. The number of pieces of hardware (e.g., the external display 310, a keyboard, a mouse) that can be connected with the electronic device 101 simultaneously may be increased by the external electronic device 330 and the interface 335. When the electronic device 101 and the external display 310 are connected with each other by the external electronic device 330, information corresponding to a UI generated in the processor 120 of the electronic device 101 may be transmitted to the external display 310 and the DDI through the interface 335.

When the external display 310 is directly connected with the electronic device 101 through the interface 177, or when the external display 310 is connected with the electronic device 101 through the external electronic device 330 for extending the interface 177 of the electronic device 101, the processor 120 may obtain a second UI which is different from a first UI outputted in the display 320 and outputted to the external display 310, by using an application outputting the first UI to the display 320.

The second UI may be outputted on the external display 310 in response to a connection between the electronic device 101 and the external display 310. The processor 120 may output the obtained second UI on the external display 310 in response to a user input related to the first UI outputted in the display 320. In this case, the user may receive the plurality of UIs generated in one application which is running in the processor 120, simultaneously, through the display 320 of the electronic device 101 and the external display 310.

Although FIGS. 3A and 3B depict that the electronic device 101 and the external electronic device are connected with each other wiredly, various embodiments are not limited thereto. The electronic device 101 and the external electronic device may be connected with each other wirelessly. The electronic device 101 and the external electronic device may be connected with each other wirelessly based on at least one of Bluetooth, WiFi, digital living network alliance (DLNA).

Hereinafter, the operation of the processor 120 outputting the plurality of UIs generated in at least one application which is running in the processor 120 to the display 320 of the electronic device 101 and the external display 310, simultaneously, in response to the connection between the electronic device 101 and the external display 310 will be described in detail.

Figure 4:
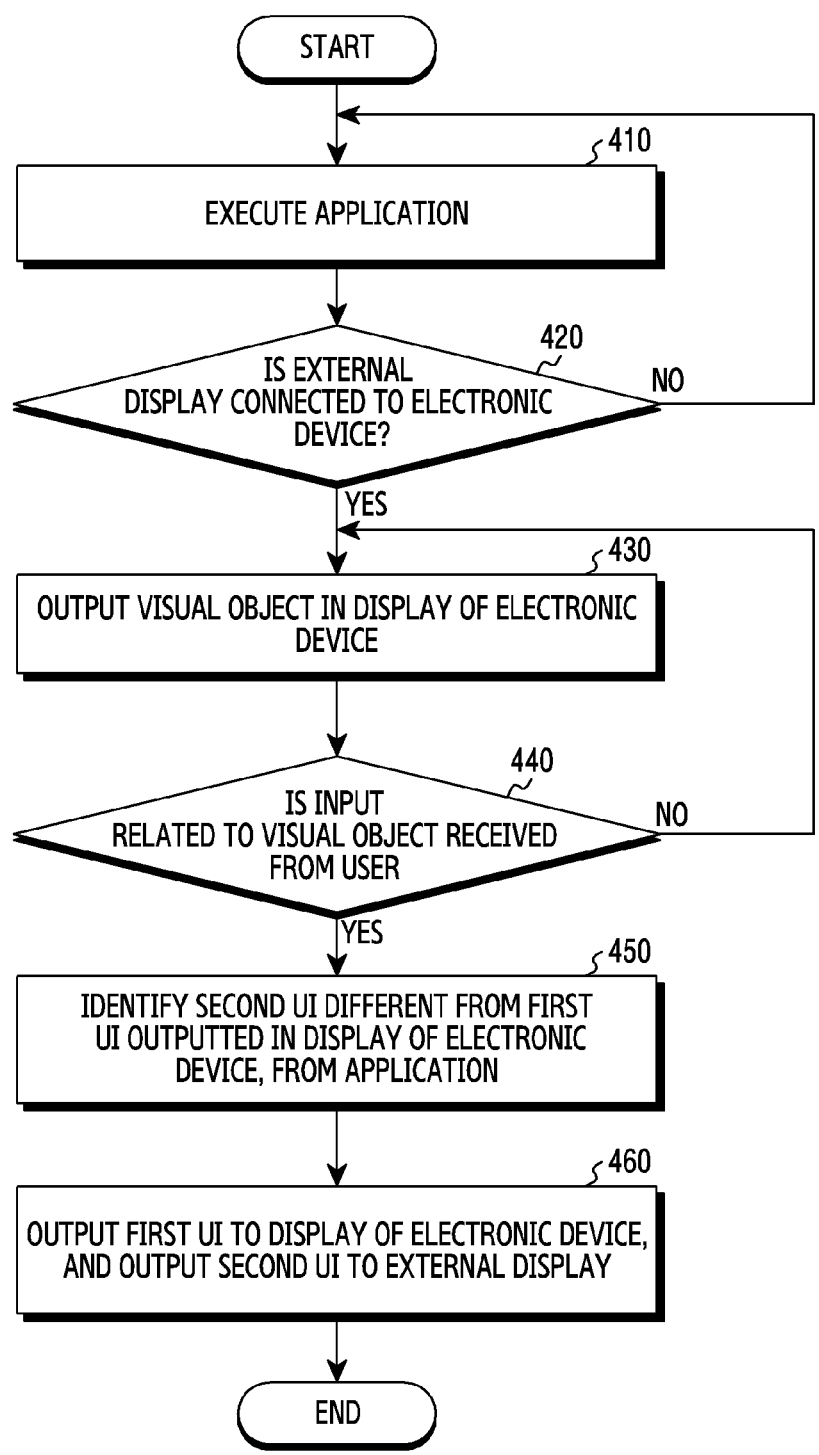
FIG. 4 is a flowchart of a method of outputting a plurality of user interfaces (UIs) identified from a running application to a display of the electronic device and an external display, respectively, according to an embodiment.

FIG. 4 is a flowchart of a method of outputting a plurality of UIs identified from a running application to a display of the electronic device and an external display, respectively, according to an embodiment. The electronic device of FIG. 4 may correspond to the electronic device 101 of FIG. 1 and FIGS. 3A and 3B. The steps of FIG. 4 may be executed by the electronic device 101 of FIG. 1 and FIGS. 3A and 3B, or the processor 120 of the electronic device 101 of FIG. 1 and FIGS. 3A and 3B.

Referring to FIG. 4, at step 410, the electronic device may execute an application in response to a control by a user. The application may be executed by a processor included in the electronic device. While the application is being executed, the electronic device may output a first UI generated from the application in the display included in the electronic device (e.g., the display 320 of FIGS. 3A and 3B). While the user is controlling the first UI (e.g., by touching a touch sensor formed on the display of the electronic device), the electronic may identify and process various events which are defined in the application in response to a control of the first UI.

Referring to FIG. 4, at step 420, the electronic device may detect a connection between an external display and the electronic device. Step 420 may be performed by the processor of the electronic device while the application is being executed. When the user directly connects an external display to the electronic device after the application is executed, or when the user connects the external display to the electronic device by using the external electronic device 330 of FIG. 3B, the electronic device may detect the external display based on a plug and play (PnP) method.

In response to the connection between the external display which is identified from the display outputting the first UI, and the electronic device, the electronic device may output the first UI and a visual object floated on the first UI in the display of the electronic device by using the running application at step 430. The visual object may be related to the external display. The visual object may correspond to a function of allowing the running application to control the display of the electronic device and the external display simultaneously. The visual object may correspond to a function of switching an operation mode of the application into an operation mode for using the display of the electronic device and the external display simultaneously (e.g., a dual mode). Whether the visual object is outputted on the first UI may depend on whether the application running in the electronic device supports the operation mode for using the display of the electronic device and the external display simultaneously.

After the visual object is outputted on the first UI, the electronic device may detect a first input related to the visual object from the user at step 440. The visual object may have a text message floated on the first UI, a button-shaped icon, or a form of an image object on the display of the electronic device. When the electronic device includes a touch sensor disposed on the display, the first input may correspond to a user's touch input which occurs in a region corresponding to the visual object floated on the first UI.

When the first input related to the visual object is received from the user, the electronic device may identify a second UI different from the first UI outputted in the display of the electronic device from the running application at step 450. When the external display has a different size from the display of the electronic device, the electronic device may identify the second UI generated by the application based on the size of the external display.

Referring to FIG. 4, at step 460, the electronic device may output the first UI on the display of the electronic device and may output the identified second UI to the external display. While outputting the first UI on the display of the electronic device, the electronic device may output the identified second UI on the external display. A configuration of a display of the first UI may be different from a configuration of a display of the second UI. Both the first UI and the second UI may be generated by the application which is executed in the processor of the electronic device.

In response to a second input of the user on the first UI, the electronic device may change the display of the first UI. The display of the second UI may be maintained independently from the reception of the second input. Alternatively, since both the first UI and the second UI are generated by one application, a user input on any one interface of the first UI or the second UI may be used to change the display of both the first UI and the second UI.

Figure 5A:
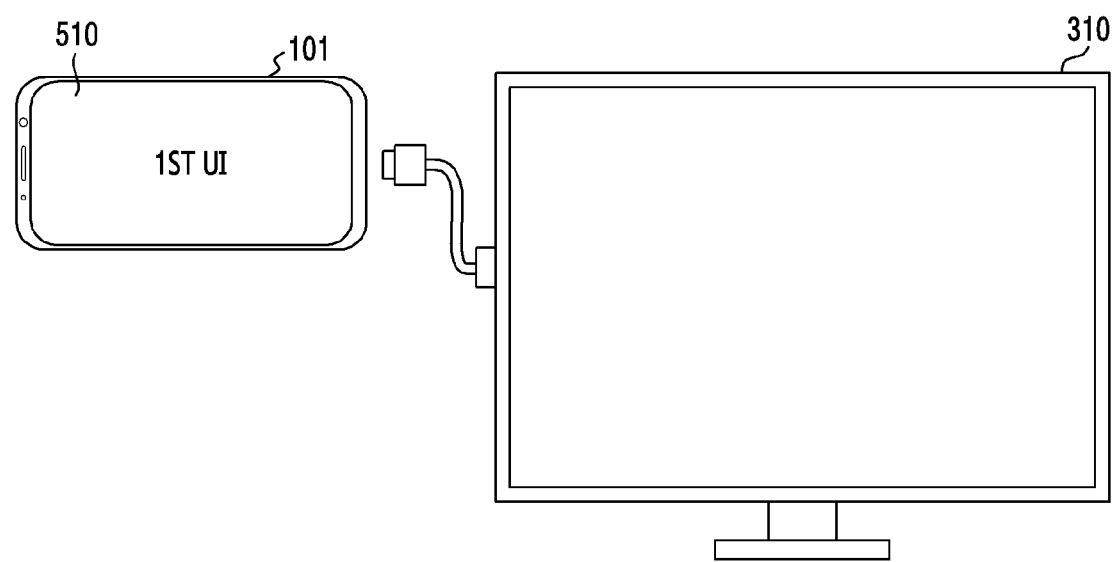
FIG. 5A is a diagram of an example in which an electronic device outputs a first UI and a second UI obtained from an application to a display of the electronic device and an external display, respectively, according to an embodiment.
Figure 5B:
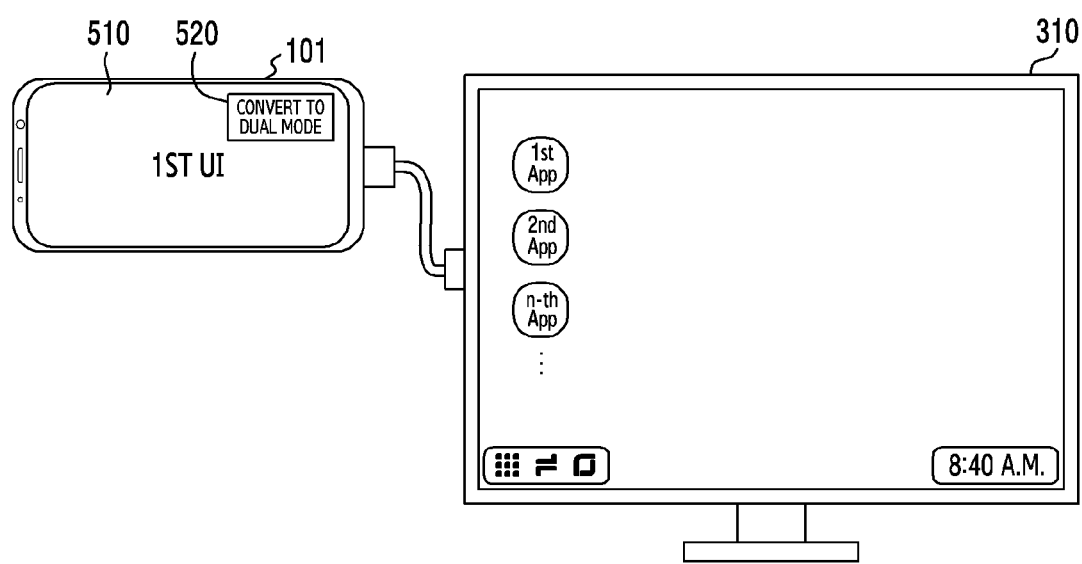
FIG. 5B is a diagram of an example in which the electronic device outputs the first UI and the second UI obtained from the application to the display of the electronic device and the external display, respectively, according to an embodiment.
Figure 5C:
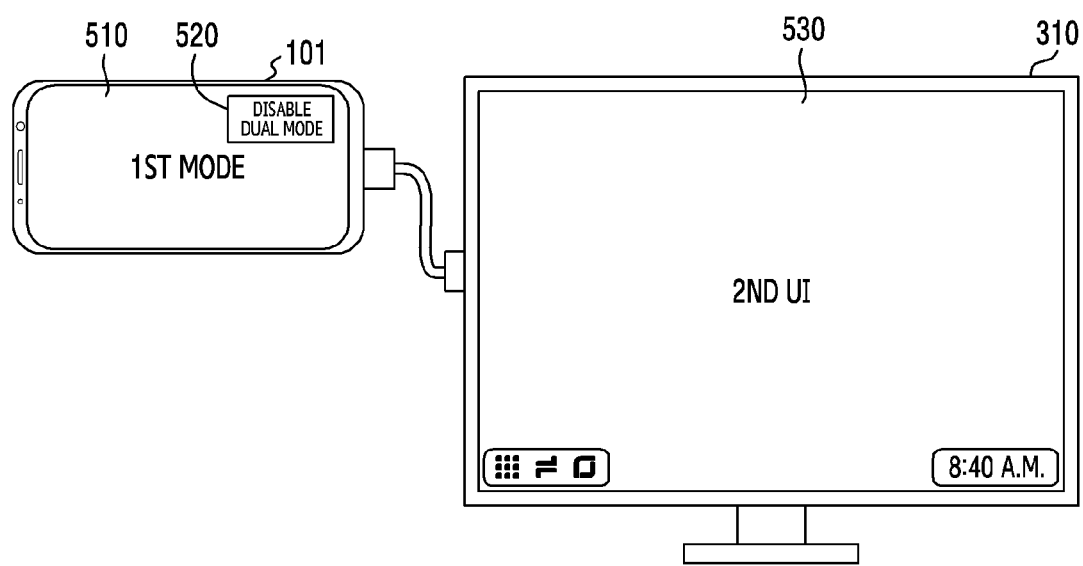
FIG. 5C is a diagram of an example in which the electronic device outputs the first UI and the second UI obtained from the application to the display of the electronic device and the external display, respectively, according to an embodiment.

FIG. 5A is a diagram of an example in which an electronic device outputs a first UI and a second UI obtained from an application to a display of the electronic device and an external display, respectively, according to an embodiment. FIG. 5B is a diagram of an example in which the electronic device outputs the first UI and the second UI obtained from the application to the display of the electronic device and the external display, respectively, according to an embodiment. FIG. 5C is a diagram of an example in which the electronic device outputs the first UI and the second UI obtained from the application to the display of the electronic device and the external display, respectively, according to an embodiment. The electronic device 101 of FIGS. 5A, 5B, and 5C may be related to the electronic device 101 of FIG. 1 and FIG. 3A, and the electronic device of FIG. 4. Steps of the electronic device 101 of FIGS. 5A, 5B, and 5C may be related to the steps of FIG. 4. The external display of FIGS. 5A, 5B, and 5C may be related to the external display 310 of FIGS. 3A and 3B.

Referring to FIG. 5A, before the electronic device 101 and the external display 310 are connected with each other, the electronic device 101 may output the first UI 510 identified from the application in the display of the electronic device 101. The application outputting the first UI 510 in the display of the electronic device 101 may be executed by a user or an operating system. The user may control the application running in the electronic device 101 by using the first UI 510.

Referring to FIG. 5A, before the electronic device 101 and the external display 310 are connected with each other, the external display 310 may operate independently from the electronic device 101. A state of the external display 310 may correspond to an idle state in which the external display 310 waits for a signal from a processor (e.g., the processor of the electronic device 101) existing outside the external display 310.

Referring to FIG. 5B, after the electronic device 101 and the external display 310 are connected with each other, the electronic device 101 may control the external display 310 and the display of the electronic device 101 simultaneously. The electronic device 101 controlling the external display 310 and the display of the electronic device 101 simultaneously may be related to step 420 of FIG. 4 or steps after step 420.

In response to the connection between the electronic device 101 and the external display 310, the electronic device 101 may output a UI for allowing the user to select a mode of the external display from (1) a mirroring mode in which an image of the display of the electronic device 101 is displayed as it is, or (2) a desktop mode in which an image different from the display of the electronic device 101 is displayed and a workspace of the display of the electronic device 101 is extended.

When the user selects the desktop mode, the electronic device 101 may output a UI (e.g., a home screen generated based on a size or a type of the external display 310) for selecting an application to be executed in the external display 310 on the external display 310, based on an operating system running in the electronic device 101. Referring to FIG. 5B, the UI outputted on the external display 310 based on the operating system executed by the electronic device 101 may include a list of applications based on visual objects (e.g., icons or thumbnails) corresponding to one or more applications installed in the electronic device 101.

At the same time as outputting the UI including the list of applications on the external display 310, the electronic device 101 may inform the application outputting the first UI 510 that the electronic device 101 and the external display 310 are connected with each other, based on the operating system running in the electronic device 101. The electronic device 101 may invoke or execute an event related to the connection between the electronic device 101 and the external display 310 among events defined in the application.

In response to the event related to the connection between the electronic device 101 and the external display 310 being invoked or executed, the electronic device 101 may output a visual object 520 designated by the running application on the first UI 510 outputted in the display of the electronic device 101. The visual object 520 may occupy a designated region of the display of the electronic device 101 regardless of whether the first UI 510 is changed. The electronic device 101 may output the visual object 520 on the first UI 510 based on step 430 of FIG. 4. The visual object 520 may include a text message or an icon informing the user that it is possible to control the application by using the display of the electronic device 101 and the external display 310 simultaneously.

Referring to FIG. 5C, after the user touches the visual object 520, the electronic device 101 may control both the display 320 of the electronic device 101 and the external display 310 based on the first UI 510 and the second UI 530 generated from the application running in the electronic device 101. The second UI 530 may be identified from the application running in the electronic device 101, based on step 450 of FIG. 4. The electronic device 101 may generate the second UI 530 based on the application related to the first UI 510 and information related to the external display 310.

The electronic device 101 may output the first UI 510 and the second UI 530 identified from one application to the display of the electronic device 101 and the external display 310, respectively and simultaneously. The second UI 530 may be outputted on the external display 310 and may be floated on a UI generated based on the operating system of the electronic device 101. The electronic device 101 may arrange different visual objects on the first UI 510 and the second UI 530 according to different layouts.

After the first UI 510 and the second UI 530 identified from one application are outputted to the display of the electronic device 101 and the external display 310, respectively and simultaneously, the visual object 520 may include a text message or an icon informing that it is possible to control the application only by the display of the electronic device 101 without the external display 310. The user may change the state of the application running in the electronic device 101 to a previous state before the second UI 530 is generated on the external display 310 by touching the visual object 520. In response to a user input related to the visual object 520 of FIG. 5C, the electronic device 101 may discard the second UI 530 outputted in the external display 310 from the external display 310.

The visual object 520 may be outputted in response to the connection between the electronic device 101 and the external display 310, and may allow the application running in the electronic device 101 to toggle between a first state in which only the first UI 510 is outputted, and a second state in which the first UI 510 and the second UI 530 are outputted simultaneously.

Although FIGS. 5A, 5B, and 5C illustrate the connection between the electronic device 101 and the external display 310 based on the embodiment illustrated in FIG. 3A, various embodiments are not limited to the embodiment of FIGS. 5A, 5B, and 5C. Even when the electronic device 101 and the external display 310 are connected with each other through another electronic device (e.g., the external electronic device 330 of FIG. 3B) for increasing the number of pieces of hardware that can be connected to the electronic device 101 simultaneously, the electronic device 101 and the external display 310 may operate similarly to those of FIGS. 5A, 5B, and 5C.

Figure 6:
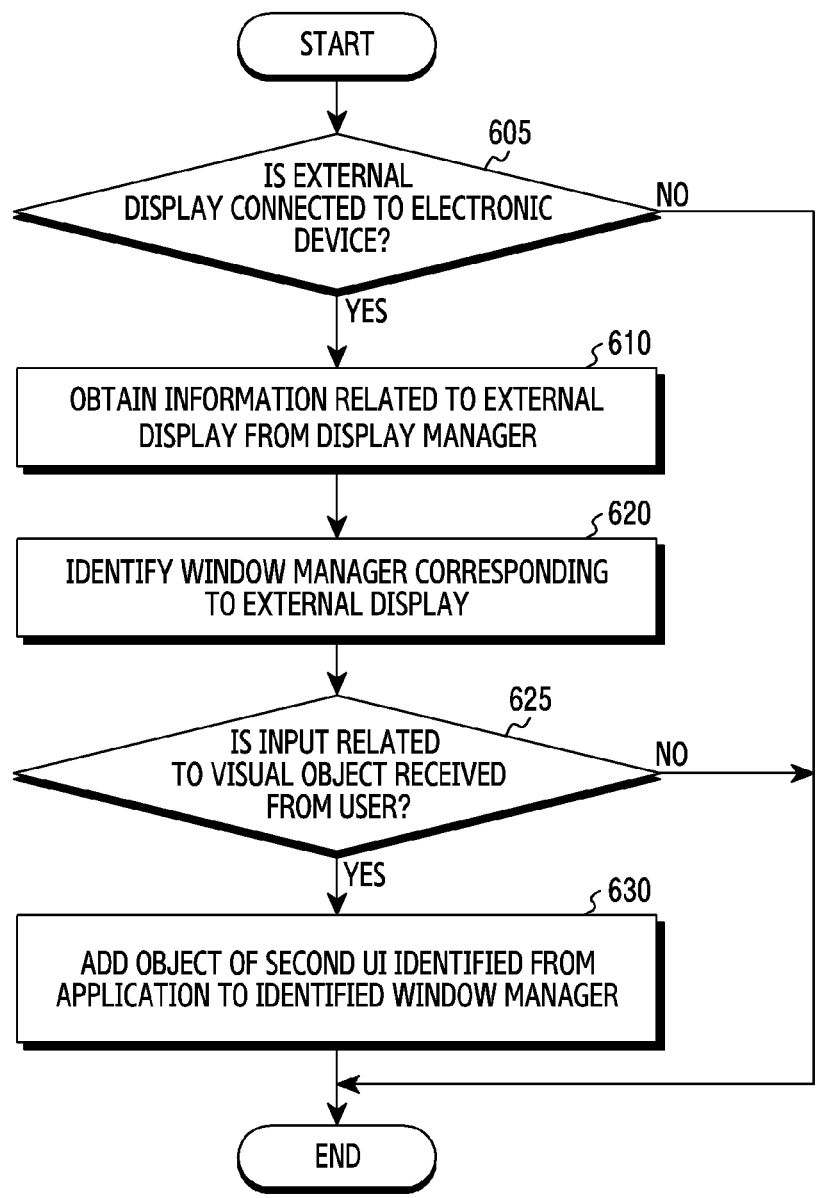
FIG. 6 is a flowchart of a method of identifying, by an electronic device, a second UI based on information related to an external display, according to an embodiment.

FIG. 6 is a flowchart of a method of identifying, by an electronic device, a second UI based on information related to an external display, according to an embodiment. The electronic device of FIG. 6 may correspond to the electronic device 101 of FIG. 1 and FIGS. 3A, and 3B. Steps of FIG. 6 may be performed by the electronic device 101 of FIG. 1 and FIGS. 3A, and 3B or the processor 120 of the electronic device 101 of FIG. 1 and FIGS. 3A and 3B. The steps of FIG. 6 may be performed based on an operating system or system software which is running in the electronic device 101.

Referring to FIG. 6, at step 605, the electronic device may detect a connection between the external display and the electronic device. Step 605 may correspond to step 420 of FIG. 4.

In response to a connection between the external display and the electronic device, the electronic device may obtain information related to the external display from a display manager, which is a process or middleware executed by the operating system, at step 610. The display manager may be included as a part of the graphic manager 221 of FIG. 2. The information related to the external display may include a value related to at least one of a size of the external display, a resolution of the external display, and pixel per inch (ppi) of the external display.

Referring to FIG. 6, at step 620, the electronic device may identify a window manager corresponding to the external display. The window manager may correspond to the window manager 203 of FIG. 2. The window manager may be a process or middleware that is generated based on the size or resolution of the external display, and is managed by the operating system. The window managers for the display of the electronic device and the external display may be independently executed. The window managers for the display of the electronic device and the external display may be executed in the processor of the electronic device based on processes independent from one another.

Steps 610 and 620 may be performed at the same as step 430 of FIG. 4. While step 610 or 620 is performed, the electronic device may output a visual object (e.g., the visual object 520 of FIG. 5B) for controlling the application by using the display of the electronic device and the external display simultaneously on the first UI generated by the running application.

After outputting the visual object on the first UI, the electronic device may detect an input related to the visual object from the user at step 625. Step 625 may correspond to step 440 of FIG. 4.

When the input related to the visual object is received from the user, at step 630, the electronic device may add an object included in the second UI identified from the application to the window manager identified based on step 620. The electronic device may provide the identified window manager to the application. The second UI may be identified from the application running in the electronic device based on step 450 of FIG. 4. The object included in the second UI may correspond to a view object which is a basic unit constituting a visual object in the Android operating system, or may be an object inheriting the view object. The second UI may include a canvas including the entire multimedia content included in the first UI.

The electronic device may output the object included in the second UI, added to the window manager, in the external display corresponding to the window manager. Based on the visual object inputted to the window manager by the application, the electronic device may identify the second UI to be outputted to the external display. The window manager corresponding to the external display may be removed when the application is terminated, the connection between the external display and the electronic device is terminated, or the user terminates controlling the application by using the display of the electronic device and the external display simultaneously (e.g., when the user toggles the visual object 520 of FIGS. 5B and 5C).

Figure 7:
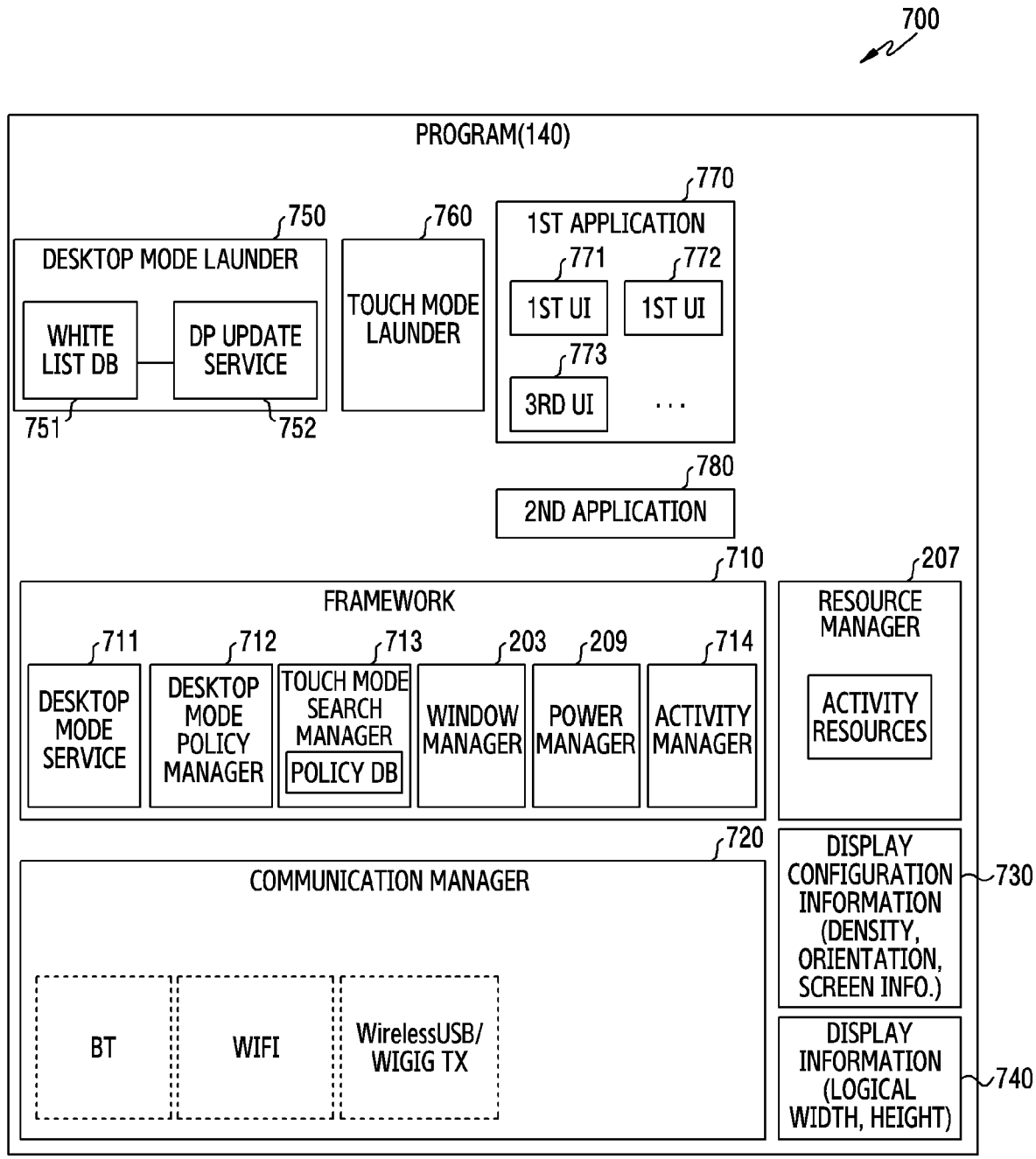
FIG. 7 is a diagram of a program executed in an electronic device, according to an embodiment.

FIG. 7 is a diagram 700 of a program executed in an electronic device, according to an embodiment.

Referring to FIG. 7, the electronic device may include at least one of a touch mode launcher 760 or a desktop mode launcher 750 for generating a UI (e.g., a home screen or a desktop) to allow the user to select one or more functions supported in the electronic device after a booting operation is performed by an operating system. The UI generated by the touch mode launcher 760 or the desktop mode launcher 750 may include a list of one or more applications (e.g., a first application 770, a second application 780) installed in the electronic device.

A touch mode and a desktop mode which is a part of designated operation modes of the electronic device are designated modes that are used to determine a layout of a UI or a window to be outputted through the display. The touch mode and the desktop mode may be set according to each of one or more displays connected with the electronic device. The touch mode and the desktop mode may be switched based on a user input. The electronic device may determine an operation mode corresponding to a touch screen to the touch mode, and may generate a UI to be outputted through the touch screen based on a layout through which a user's touch input can be easily received. The electronic device may determine an operation mode corresponding to a display that does not include a touch screen, such as an external display, to the desktop mode, and may generate a UI to be outputted through the display based on a layout through which a keyboard or mouse input of a user can be easily received.

Based on the touch mode launcher 760, the electronic device may output a UI for providing a user experience related to a touch sensor coupled to the display on the display of the electronic device. The UI outputted based on the touch mode launcher 760 may provide usability similar to a smartphone or a smart pad to the user. Based on the desktop mode launcher 750, the electronic device may output a UI for providing a user experience related to a keyboard or a mouse on the external display. The UI outputted based on the desktop mode launcher 750 may provide usability similar to a desktop PC to the user.

When the electronic device is connected with the external display, the electronic device may obtain a UI to be outputted on the display of the electronic device from the touch mode launcher 760, and may obtain a UI to be outputted on the external display from the desktop mode launcher 750. The electronic device may output the UI obtained from the touch mode launcher 760 and the UI obtained from the desktop mode launcher 750 to the display of the electronic device and the external display, respectively and simultaneously. The list of applications installed in the electronic device may be displayed on both the display of the electronic device and the external display.

The desktop mode launcher 750 may include a white list database (DB) 751 and a DB update service 752 for managing information of the white list DB 751. The white list DB 751 may include a list of applications supporting changing (resizing) of a size of a window or a UI among the applications installed in the electronic device. The whist list DB 751 may include a list of applications which can be executed in the desktop mode without breaking a layout. The list of applications may be based on names of the applications or names of packages corresponding to the applications. The DB update service 752 may update the white list DB 751 based on a server connected to the electronic device. The DB update service 752 may receive information necessary for updating the white list DB 751 from the server through a desktop mode policy manager 712.

When the user selects a certain application from the list of applications outputted on the display of the electronic device and generated based on the touch mode launcher 760, the electronic device may identify a UI to be outputted on the display of the electronic device based on the selected application. The identified UI may have a layout based on the touch mode. When the user selects a certain application from the list of applications outputted on the external display and generated based on the desktop mode launcher 750, the electronic device may identify a UI to be outputted on the external display based on the selected application. The identified UI may have a layout based on the desktop mode.

Referring to FIG. 7, when the user selects the first application 770, the electronic device may identify a UI to be outputted to the display of the electronic device or the external display, based on at least one of a first UI 771, a second UI 772, and a third UI 773 which are defined in the first application 770. Each of the first UI 771, the second UI 772, and the third UI 773 may correspond to an activity of the Android operating system. Each of the first UI 771, the second UI 772, and the third UI 773 may have a layout based on any one of a landscape mode or a portrait mode according to an orientation of the display.

When the first application 770 operates based on the operation mode (e.g., the dual mode) in which the display of the electronic device and the external display are used simultaneously, the electronic device may output the first UI 771 on the display of the electronic device and may output the second UI 772 on the external display. The electronic device may output a part of the first UI 771 on the display of the electronic device and may output the other part of the first UI 771 on the external display. The electronic device may output a part of the first UI 771 on the display of the electronic device, and may output the entire first UI 771 on the external display.

Referring to FIG. 7, the electronic device may provide a function or information provided from one or more resources of the electronic device to an application installed in the electronic device, by using a framework 710. The applications installed in the electronic device such as the first application 770, the desktop mode launcher 750, and the touch mode launcher 760 may obtain a function or information of the electronic device through the framework 710. The framework 710 may correspond to at least a part of the middleware 144 of FIG. 2.

Based on a desktop mode service 711, the electronic device may obtain information related to an operation in the desktop mode from an application which is expected to be executed according to user's selection. The electronic device may identify whether the application will be executed based on a static window, whether the application will be executed based on a freeform window, whether change of an orientation is supported, or whether resizing is supported, by using the desktop mode service 711. Based on the desktop mode service 711, the electronic device may determine whether the application that is expected to be executed is included in the white list DB 751, and then the electronic device may identify whether an application will be executed based on a static window, whether an application will be executed based on a freeform window, whether change of an orientation is supported, or whether resizing is supported, according to each application from the desktop mode policy manager 712.

When an application is executed based on a static window, the electronic device may change display configuration information 730 and display information 740, and may transmit the changed information to the application. Since the electronic device changes the display configuration information 730 and the display information 740 which are based on a real size of the display, and transmits the changed information to the application, an error in processing a layout or in processing a touch input, which may occur in the application, can be prevented. The display configuration information 730 may include values related to a density, an orientation, screen size information (width, height) of the display, and the display information 740 may include values related to logical width, logical height.

Based on the touch mode policy manager 713, the electronic device may obtain information related to an operation in the touch mode from an application which is expected to be executed according to user's selection. Based on a window manager 203, the electronic device may output a UI obtained from an application on the display. Based on a power manager 209, the electronic device may perform power management of the electronic device. Based on an activity manager 714, the electronic device may manage a UI generated in one or more running applications on a basis of an activity. Based on a communication manager 720, the electronic device may manage a communication means for connecting the electronic device to another electronic device.

Figure 8:
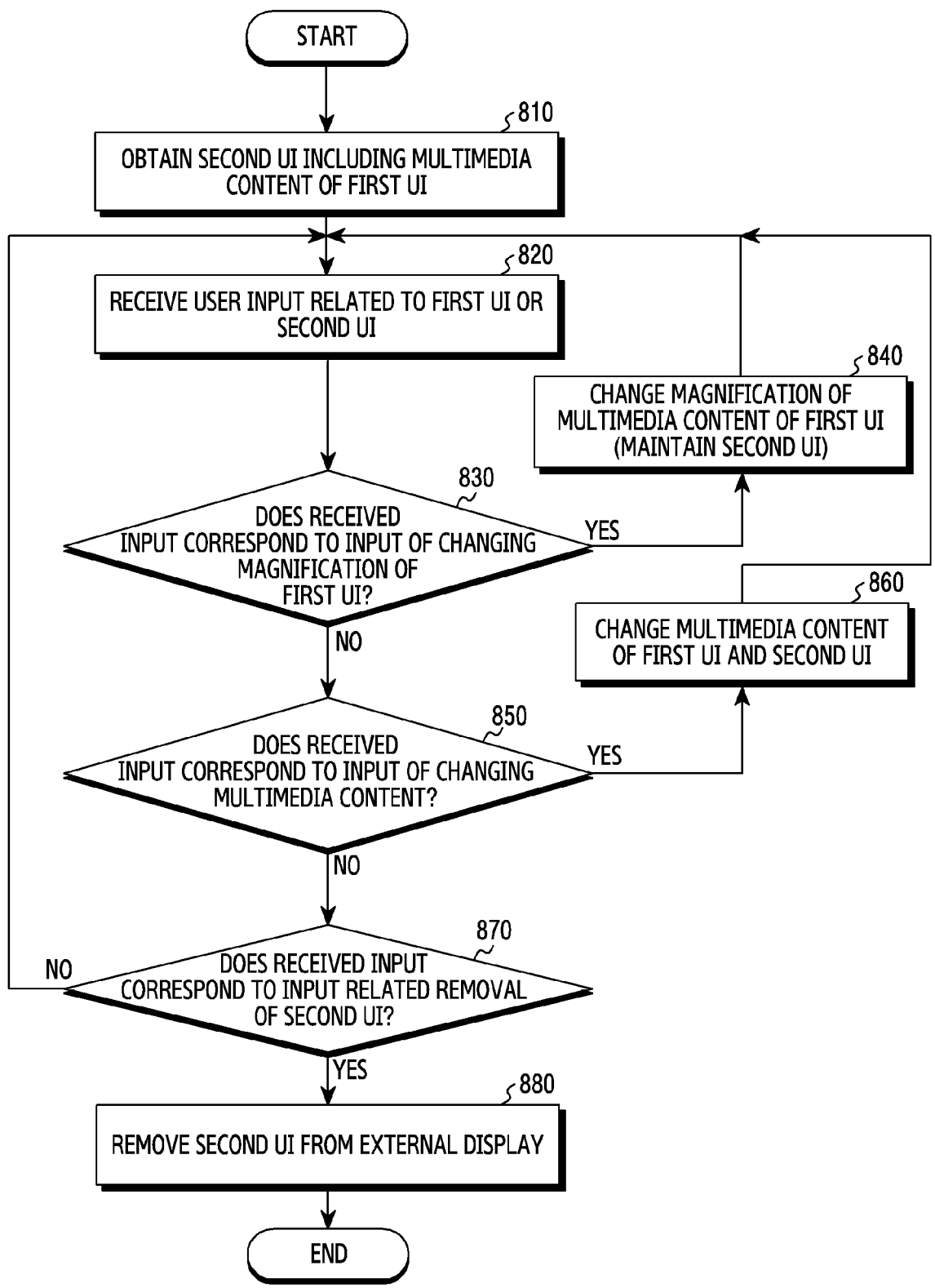
FIG. 8 is a flowchart of a method of processing, by an electronic device, a user input received from a first UI and a second UI outputted to a plurality of displays, respectively, according to an embodiment.

FIG. 8 is a flowchart of a method of processing, by an electronic device, a user input received from a first UI and a second UI outputted to a plurality of displays, respectively, according to an embodiment. The electronic device of FIG. 8 may correspond to the electronic device of FIG. 1 and FIGS. 3A and 3B. Steps of FIG. 8 may be executed by the electronic device of FIG. 1 and FIGS. 3A and 3B, or the processor 120 of the electronic device 101 of FIG. 1 and FIGS. 3A and 3B. The steps of FIG. 8 may be related to step 460 of FIG. 4.

Referring to FIG. 8, at step 810, the electronic device may obtain a second UI including a multimedia content of a first UI outputted on a display of the electronic device from a running application. Step 810 may be performed in response to a connection between the electronic device and an external display or a user input related to the external display (e.g., a user's operation of touching the visual object 520 of FIG. 5B). A configuration of a display of the second UI may be different from a configuration of a display of the first UI. The second UI may be generated based on information related to the display of the electronic device. The obtained second UI may be outputted on the external display. The output of the second UI may be performed at the same time as the output of the first UI through the display of the electronic device.

Referring to FIG. 8, at step 820, the electronic device may receive a user input related to the first UI or the second UI. When the display of the electronic device is coupled to a touch sensor, the user input related to the first UI may correspond to a gesture of touching a specific region of the touch sensor or a gesture of rubbing at least a part of the touch sensor. When the second UI is outputted to the external display that does not include a touch sensor, a user input related to the second UI may correspond an action (e.g., clicking, dragging, inputting a text) performed on an object outputted through the second UI by using a mouse or keyboard connected to the electronic device.

In response to the user input being received, the electronic device may identify an event corresponding to the received input among a plurality of events defined in the application. Step 830, step 850, and step 870 may be related to an operation of the electronic device identifying an event corresponding to a received input among a plurality of events defined in the application. The order of executing step 830, step 850, and step 870 by the electronic device is not limited to the order illustrated in FIG. 8. Step 830, step 850, and step 870 may be performed by the electronic device simultaneously.

Referring to FIG. 8, at step 830, the electronic device may determine whether the received input corresponds to an input of changing a magnification of the first UI. When the received input corresponds to a designated gesture (e.g., a pinch-to-zoom gesture), the electronic device may determine that the received input corresponds to an input of changing the magnification of the first UI.

In response to the user input corresponding to the input of changing the magnification of the first UI being received, the electronic device may change a magnification of a multimedia content outputted through the first UI at step 840. When the first UI and the second UI are independently controlled by one application which is running in the electronic device, a magnification of the multimedia content outputted through the second UI may be maintained while the magnification of the multimedia content outputted through the first UI is changed. The step of the electronic device changing the magnification of the multimedia content will be described in detail with reference to FIGS. 9A, 9B, 9C, and 9D.

Referring to FIG. 8, at step 850, the electronic device may determine whether the received input corresponds to an input of changing the multimedia content. When the received input corresponds to a gesture (e.g., a drag gesture) performed on the multimedia content, the electronic device may determine that the received input corresponds to the input of changing the multimedia content.

In response to the user input corresponding to the input of changing the multimedia content being received, the electronic device may change the multimedia content of the first UI and the second UI based on the user input at step 860. The step of the electronic device changing the multimedia content based on the user input will be described in detail with reference to FIG. 10 and FIGS. 11A and 11B.

Referring to FIG. 8, at step 870, the electronic device may determine whether the received input corresponds to an input related to removal of the second UI. When the received input is related to a visual object displayed or floated on the first UI or the second UI, the electronic device may determine that the received input corresponds to the input related to the removal of the second UI.

In response to the user input corresponding to the input of removing the second UI being received, the electronic device may remove the second UI from the external display at step 880. The electronic device may change an image outputted on the external display from an image corresponding to the second UI to an image corresponding to the UI (e.g., a home screen or a desktop screen) identified from the operating system. While the second UI is removed from the external display, the first UI outputted on the display of the electronic device may be maintained.

Figure 9A:
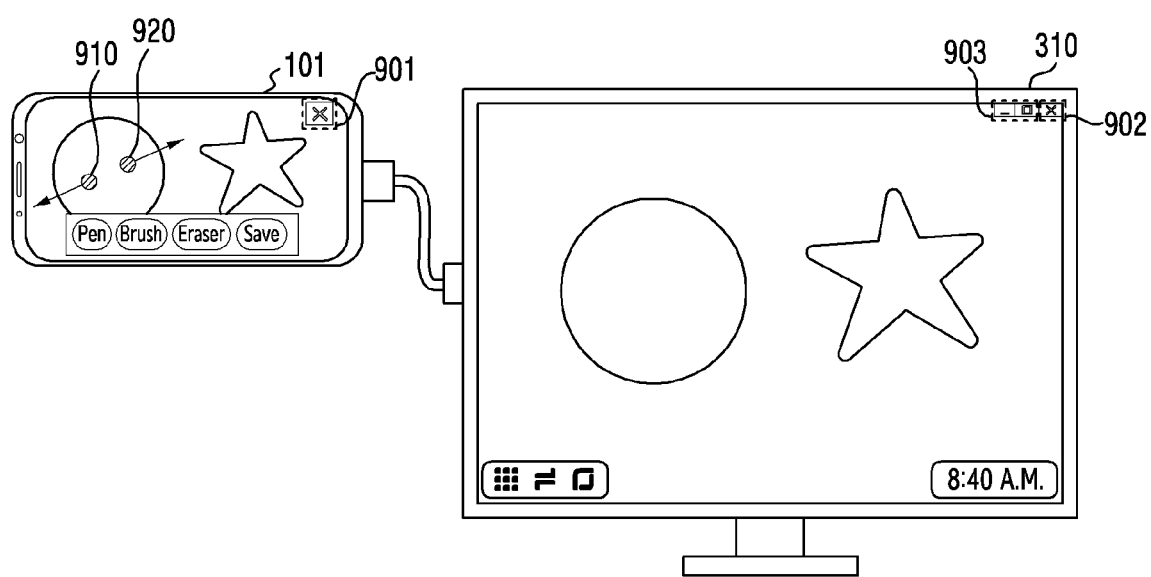
FIG. 9A is a diagram of an example in which, in response to a user input, an electronic device changes a magnification of a multimedia content displayed on a first UI while maintaining a magnification of a multimedia content displayed on a second UI, according to an embodiment.
Figure 9B:
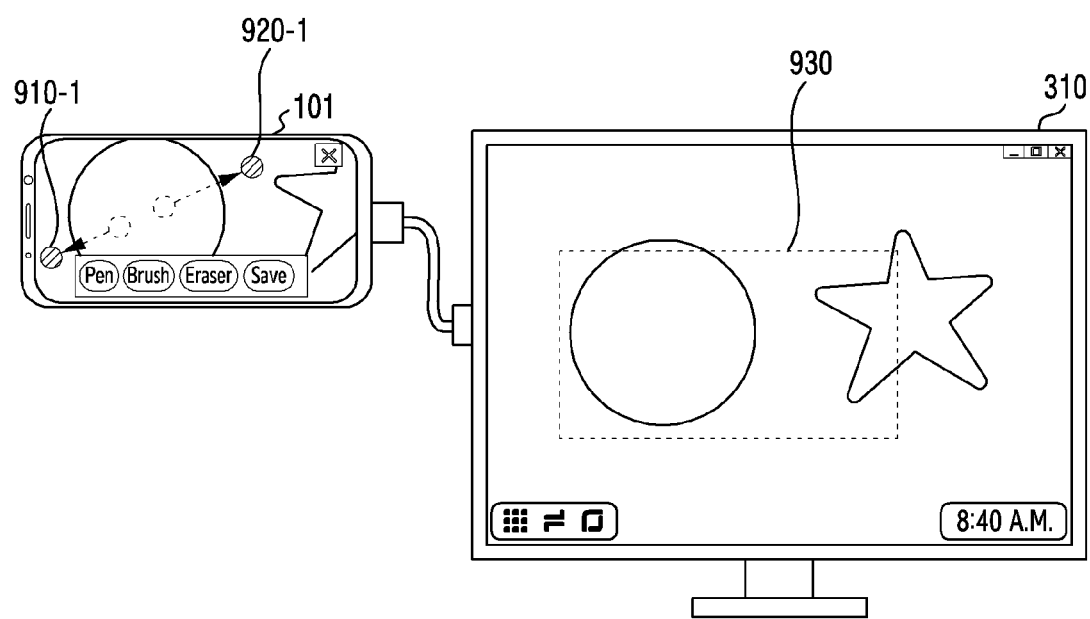
FIG. 9B is a diagram of an example in which, in response to the user input, the electronic device changes the magnification of the multimedia content displayed on the first UI while maintaining the magnification of the multimedia content displayed on the second UI, according to an embodiment.
Figure 9C:
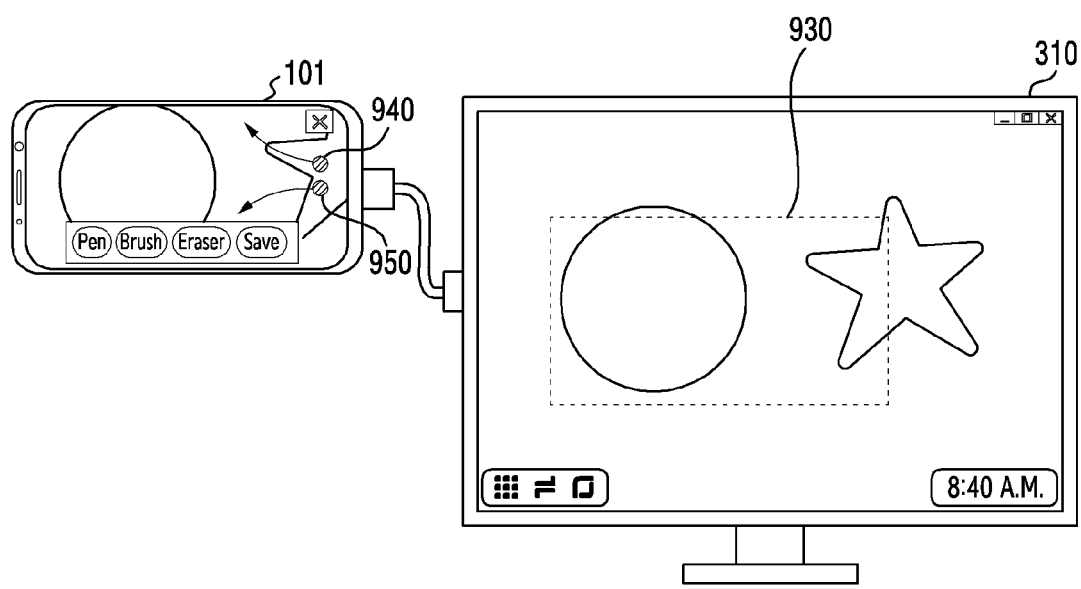
FIG. 9C is a diagram of an example in which, in response to the user input, the electronic device changes the magnification of the multimedia content displayed on the first UI while maintaining the magnification of the multimedia content displayed on the second UI, according to an embodiment.
Figure 9D:
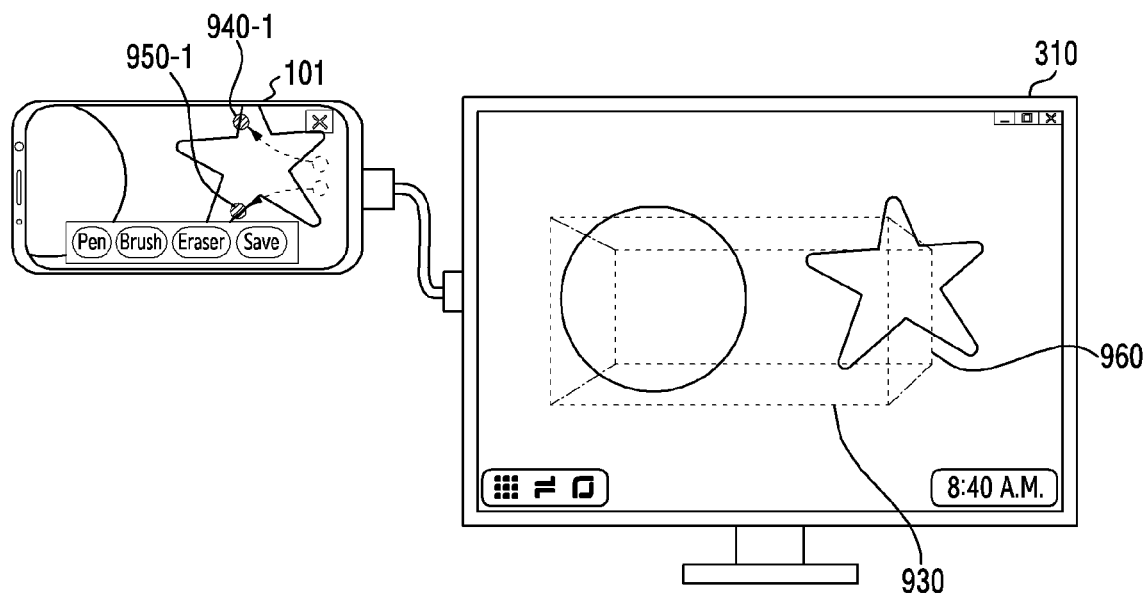
FIG. 9D is a diagram of an example in which, in response to the user input, the electronic device changes the magnification of the multimedia content displayed on the first UI while maintaining the magnification of the multimedia content displayed on the second UI, according to an embodiment.

FIG. 9A is a diagram of an example in which, in response to a user input, an electronic device changes a magnification of a multimedia content displayed on a first UI while maintaining a magnification of a multimedia content displayed on a second UI, according to an embodiment. FIG. 9B is a diagram of an example in which, in response to the user input, the electronic device changes the magnification of the multimedia content displayed on the first UI while maintaining the magnification of the multimedia content displayed on the second UI, according to an embodiment. FIG. 9C is a diagram of an example in which, in response to the user input, the electronic device changes the magnification of the multimedia content displayed on the first UI while maintaining the magnification of the multimedia content displayed on the second UI, according to an embodiment. FIG. 9D is a diagram of an example in which, in response to the user input, the electronic device changes the magnification of the multimedia content displayed on the first UI while maintaining the magnification of the multimedia content displayed on the second UI, according to an embodiment. The electronic device 101 of FIGS. 9A, 9B, 9C, and 9D may be related to the electronic device 101 of FIGS. 1 and 3A. Operations of FIGS. 9A, 9B, 9C, and 9D may be related to at least one of the steps of FIG. 4, FIG. 6, or FIG. 8. An external display of FIGS. 9A, 9B, 9C, and 9D may be related to the external display 310 of FIGS. 3A and 3B.

Referring to FIG. 9A, after the electronic device 101 and the external display 310 are connected with each other, the electronic device 101 may output a first UI and a second UI obtained from a running application to the display of the electronic device 101 and the external display 310, respectively. The operation of the electronic device 101 obtaining the first UI and the second UI to be outputted to the display of the electronic device 101 and the external display 310, respectively, from one application, may be performed based on at least one of step 810 of FIG. 8, step 460 of FIG. 4, or the steps of FIG. 6.

Referring to FIG. 9A, while the first UI and the second UI are outputted to the display of the electronic device 101 and the external display 310, respectively, the electronic device 101 may output, on at least one of the first UI and the second UI, visual objects 901, 902 for stopping outputting the plurality of UIs obtained from one application to the plurality of displays (e.g., the display of the electronic device 101 and the external display) related to the electronic device 101.

Referring to FIG. 9A, the electronic device 101 may output a visual object 903 which is displayed on the second UI outputted on the external display 310 to change the size of the second UI to any one of designated sizes. The visual object 903 may include at least one of a minimize button to reduce the size of the second UI to a minimum size guaranteeing usability, a maximize button to enlarge the size of the second UI to the full size of the external display 310, an exit button to exit from the second UI or the application, and a restore button to restore a state of the second UI or the application to a previous state before a final user input.

When a memory usable in the electronic device 101 is less than or equal to a designated threshold (e.g., 400 MB) after the user presses any one of the buttons of the visual object 903 (e.g., the maximize button), the electronic device 101 may output a warming message. When the application supports only the portrait mode and the user presses the maximize button included in the visual object 903, the electronic device 101 may enlarge the size of the second UI to a maximum size that has a size ratio of the second UI executed in the portrait mode in the external display.

Referring to FIG. 9A, configurations of the first UI and the second UI generated from one application running in the electronic device 101 may be different from each other. The first UI outputted on the display of the electronic device 101 may include one or more visual objects (e.g., a pen tool, a brush tool, an eraser tool, a save button) for changing the multimedia content. The second UI may have a layout for outputting the entire multimedia content. The first UI and the second UI may output one multimedia content at different magnifications.

Based on positions of intersections between the display and user's fingers, the number of intersections, and a path, the electronic device 101 may determine whether a user's gesture corresponds to a gesture for changing the magnification (e.g., a pinch-to-zoom gesture). In response to the gesture for changing the magnification being received, the electronic device 101 may determine a UI on which the gesture is performed among the first UI and the second UI as a UI whose magnification will be changed based on the received gesture.

Referring to FIG. 9A, the user of the electronic device 101 may perform the gesture for changing the magnification of the first UI on the first UI. The user may touch two regions 910, 920 on the display of the electronic device 101 with two fingers simultaneously, and then may increase a distance between the two fingers touching the two regions 910, 920 as indicated by the path shown in FIG. 9A (pinch-to-zoom gesture). Since the two regions 910, 920 on the display touched by the user correspond to the first UI, the electronic device 101 may determine to change the magnification of the first UI based on the user's gesture.

Referring to FIG. 9B, in response to the input of the gesture on the first UI shown in FIG. 9A, the electronic device 101 may change the magnification of the multimedia content outputted in the first UI. The user may drag the two fingers from the two regions 910, 920 of FIG. 9A to two regions 910-1, 920-1 of FIG. 9B on the display of the electronic device 101. The electronic device 101 may change the magnification of the multimedia content outputted in the first UI, based on at least one of a distance between start points of drag paths of the user's two fingers (e.g., a distance between the two regions 910, 920), a distance between end points of the drag paths (e.g., a distance between the two regions 910-1, 920-1), and a movement speed of the fingers.

Referring to FIG. 9B, while the magnification of the multimedia content outputted in the first UI is changed in response to the input of the user's gesture, the magnification of the multimedia content outputted in the second UI of the external display 310 may be maintained. As the magnification of the multimedia content outputted in the first UI is changed, the electronic device 101 may output a part of the multimedia content through the first UI. Referring to FIG. 9B, a part of the multimedia content outputted through the first UI may correspond to a part 930 of the multimedia content outputted through the second UI. In response to a user's gesture inputted through the first UI, the electronic device 101 may enlarge the part 930 of the multimedia content outputted through the second UI and may output the part 930 on the first UI. A size of the part 930 may be determined based on a magnification corresponding to the user's gesture.

While changing the magnification of the multimedia content outputted in the first UI in response to the user's gesture, the electronic device 101 may visually output which part of the multimedia content outputted in the second UI corresponds to the part of the multimedia content outputted in the first UI. The electronic device 101 may highlight the part 930 of the multimedia content outputted through the second UI by color or a figure, and may indicate which part of the multimedia content outputted in the second UI corresponds to the part of the multimedia content outputted in the first UI.

Referring to FIGS. 9C and 9D, a gesture of a different form from the gesture illustrated in FIGS. 9A and 9B is illustrated. The user may perform a pinch-to-zoom gesture of moving from starts point of two regions 940, 950 of FIG. 9C to end points of two regions 940-1, 950-1 of FIG. 9D. The user may move two fingers touching the display in one direction (a direction of moving toward the center of the display from the right border of the display) along paths shown in FIG. 9C. The user may increase a distance between the two fingers while moving the two fingers in one direction.

In response to the gesture illustrated in FIGS. 9C and 9D, the electronic device 101 may change the magnification of the first UI related to the gesture, and may shift a part of the multimedia content to be displayed through the first UI. Before the user touches the two regions 940, 940 of FIG. 9C, a part of the multimedia content outputted through the first UI may correspond to the part 930 of the multimedia content outputted through the second UI.

After the user performs the gesture of moving from the start points of the two regions 940, 950 of FIG. 9C to the end points of the two regions 940-1, 950-1 of FIG. 9D, the electronic device 101 may output a part 960 of the multimedia content outputted through the second UI through the first UI as shown in FIG. 9D. Since the user increases the distance between the two fingers, the magnification of the multimedia content outputted through the first UI may increase. In addition, since the user moves the two fingers in one direction, a part of the multimedia content outputted through the first UI may be moved based on the moving direction of the two fingers.

As described above, the electronic device may magnify/reduce or parallel move a part of the multimedia content outputted through the first UI while maintaining the display of the multimedia content outputted through the second UI in response to a user input performed in the first UI. The electronic device may rotate a part of the multimedia content outputted through the first UI while maintaining the display of the multimedia content outputted through the second UI in response to a user input performed in the first UI. When the user drags at least one of the fingers touching the two regions 910, 920 of FIG. 9A in an arc shape, the electronic device may rotate a part of the multimedia content outputted through the first UI.

Figure 10:
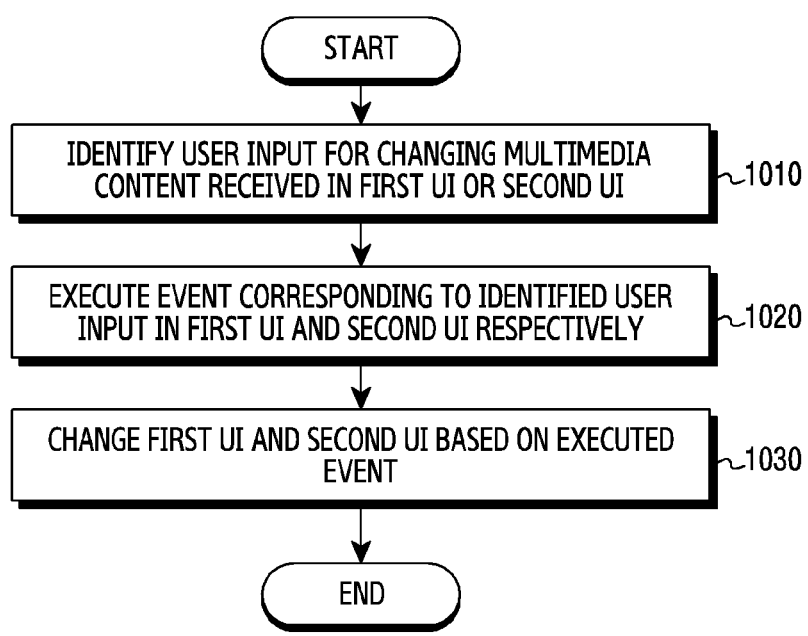
FIG. 10 is a flowchart of a method of executing, by an electronic device, an event defined in an application in response to a user input, according to an embodiment.

FIG. 10 is a flowchart of a method of executing, by an electronic device, an event defined in an application in response to a user input, according to an embodiment. The electronic device of FIG. 10 may correspond to the electronic device 101 of FIG. 1 and FIGS. 3A and 3B. Steps of FIG. 10 may be performed by the electronic device 101 of FIG. 1 and FIGS. 3A and 3B, or the processor 120 of the electronic device 101 of FIG. 1 and FIGS. 3A and 3B. The steps of FIG. 10 may be related to step 860 of FIG. 8.

Referring to FIG. 10, at step 1010, the electronic device may identify a user input which is received in a first UI and a second UI to change a multimedia content. The first UI and the second UI may be obtained by an application which is running in the electronic device, and may be outputted to the display of the electronic device and the external display, respectively. A specific example of the user input for changing the multimedia content will be described in detail with reference to FIGS. 11A and 11B.

While outputting the first UI and the second UI to the display of the electronic device and the external display, respectively, in response to the user input for changing the multimedia content being identified, the electronic device may execute an event corresponding to the identified user input in each of the first UI and the second UI at step 1020.

When the user input for changing the multimedia content is identified through the first UI, the electronic device may execute an event corresponding to the user input among a plurality of events related to the first UI defined in the application. The electronic device may change the user input identified through the first UI based on the second UI and then may execute an event corresponding to the changed user input among a plurality of events related to the second UI defined in the application.

When the electronic device executes a first process for processing the event related to the first UI and a second process for processing the event related to the second UI simultaneously, the user input identified through the first UI may be processed by the first process. While processing the user input identified through the first UI by the first process, the electronic device may copy or intercept the user input identified through the first UI based on the second process. The electronic device may process the user input copied or intercepted based on the second process, based on an entire region of the multimedia content, such as a canvas view outputting the entire multimedia content, outputted through the second UI.

The above-described step may be performed with respect to a user input identified through the second UI similarly. When the user input for changing the multimedia content is identified through the second UI, the electronic device may execute an event related to the first UI and an event related to the second UI among the plurality of events defined in the application. When executing the event related to the first UI, the electronic device may change the user input inputted through the second UI based on a part of the multimedia content outputted in the first UI.

When the electronic device executes the first process and the second process simultaneously, and identifies the user input for changing the multimedia content through the second UI, the electronic device may process the identified user input based on the second process. While processing the identified user input based on the second process, the electronic device may copy or intercept the user input identified through the second UI, based on the first process.

In response to the events corresponding to the user input identified in the first UI and the second UI, respectively, being executed, the electronic device may change the first UI and the second UI based on the executed events at step 1030. The display of the first UI outputted in the display of the electronic device, and the display of the second UI outputted in the external display may be changed based on the events executed in the first UI and the second UI respectively.

Figure 11A:
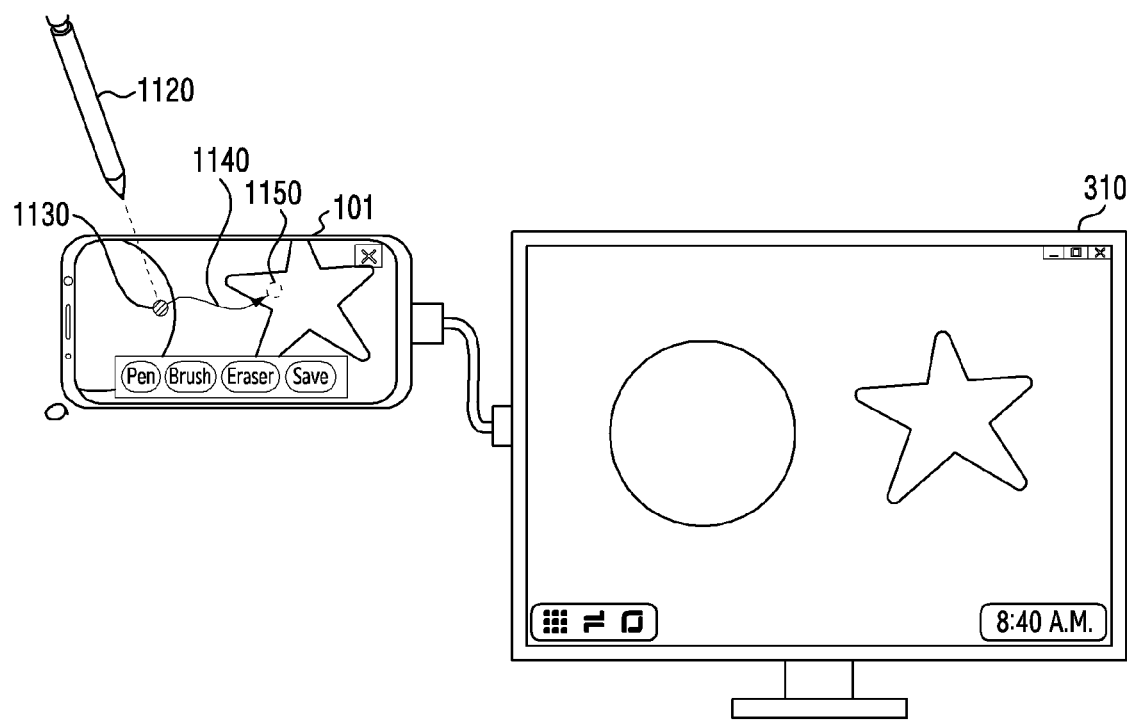
FIG. 11A is a diagram of an example in which, in response to a user input identified in any one of a first UI and a second UI, an electronic device changes a display of a multimedia content displayed on the first UI and the second UI in common, according to an embodiment.
Figure 11B:
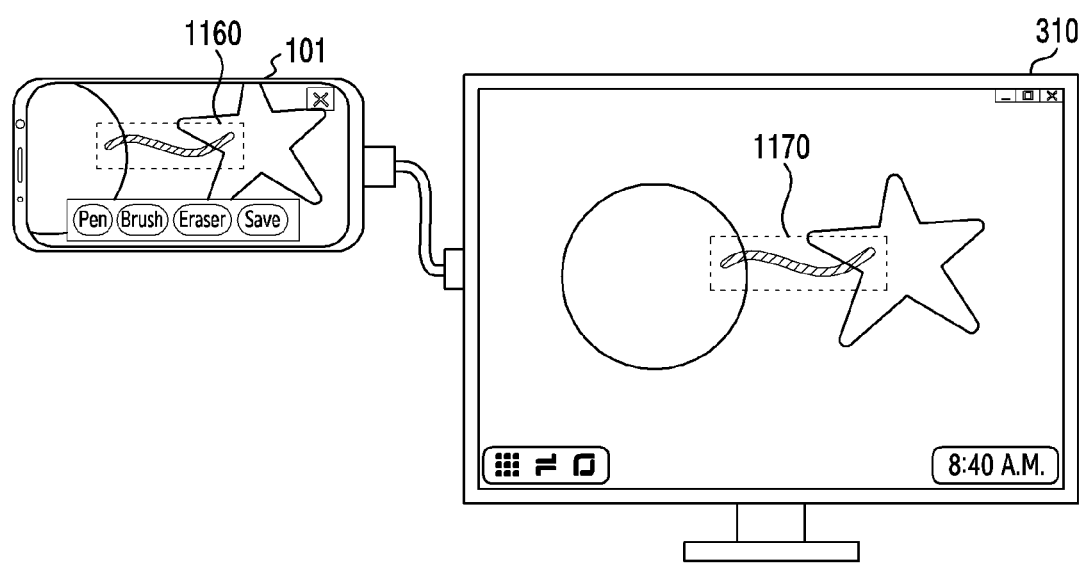
FIG. 11B is a diagram of an example in which, in response to the user input identified in any one of the first UI and the second UI, the electronic device changes the display of the multimedia content displayed on the first UI and the second UI in common, according to an embodiment.

FIG. 11A is a diagram of an example in which, in response to a user input identified in any one of a first UI and a second UI, an electronic device changes a display of a multimedia content displayed on the first UI and the second UI in common, according to an embodiment. FIG. 11B is a diagram of an example in which, in response to the user input identified in any one of the first UI and the second UI, the electronic device changes the display of the multimedia content displayed on the first UI and the second UI in common, according to an embodiment. The electronic device 101 of FIGS. 11A and 11B may be related to the electronic device 101 of FIGS. 1 and 3A. Operations of the electronic device 101 of FIGS. 11A and 11B may be related to at least one of the steps of FIG. 10. An external display of the FIGS. 11A and 11B may be related to the external display 310 of FIGS. 3A and 3B.

Referring to FIG. 11A, the electronic device 101 may display a part of a multimedia content on the display of the electronic device 101 at a first magnification, by using an application executed by the processor of the electronic device 101. In response to a connection between the external display 310, different from the display of the electronic device 101, and the electronic device 101, the electronic device 101 may display the multimedia content on the external display 310 at a second magnification different from the first magnification by using the application.

A configuration of the first UI which is outputted through the display of the electronic device 101 and displays a part of the multimedia content based on the first magnification may be different from a configuration of the second UI which is outputted through the external display 310 and displays the multimedia content based on the second magnification ratio. Referring to FIG. 11A, when the electronic device 101 executes an application for editing a multimedia content corresponding to an image, the first UI obtained from the application may include an interface 1110 for executing functions for editing the image, such as a pen tool, a brusher tool, an eraser tool, a save function, etc. The second UI may not include the interface 1110 or may include an interface for executing other functions different from the above-mentioned functions.

When the electronic device 101 includes a touch sensor for identifying a position of a user's finger or a stylus 1120 touching the display, the user may perform a gesture for changing the multimedia content by dragging on the display of the electronic device 101 with the finger or the stylus 1120. Referring to FIG. 11A, the user may touch a region 1130 of the display of the electronic device 101 with the stylus 1120 in a part of the multimedia content displayed in the first UI at the first magnification, and then may move the stylus 1120 along a path 1140. The user may release the stylus 1120 from the display in a region 1150 of the display of the electronic device 101.

Referring to FIG. 11B, in response to the user drag starting from the region 1130 of the display and moving along the path 1140, and then ending in the region 1150, the electronic device 101 may display a visual object 1160 corresponding to the drag input in a part of the multimedia content displayed in the first UI at the first magnification. The visual object 1160 may have a shape corresponding to a stroke or path 1140 of the stylus 1120. When the sensor disposed on the display of the electronic device 101 is able to detect a pressure, thickness of the visual object 1160 may be related to a pressure by the stylus 1120 detected. The user of the electronic device 101 may control various parameters of the visual object 1160 (e.g., color of the stroke, thickness of the stroke, a shape of a start point or end point of the stroke).

The electronic device 101 displaying the visual object 1160 may be performed by the steps of FIG. 10. In response to the input of the user drag performed on the display of the electronic device 101, the electronic device 101 may display a visual object 1170 corresponding to the drag input in the multimedia content of the second UI outputted in the external display 310 at the same as displaying the visual object 1160 in the first UI. The visual object 1170 may have a shape corresponding to the path 1140 of the stylus 1120.

In response to the user input for changing the multimedia content being identified, the electronic device may obtain the visual object 1160 to be outputted through the first UI and the visual object 1170 to be outputted through the second UI from the application. The electronic device may superimpose the identified visual objects 1160, 1170 on the multimedia content based on different magnifications in the first UI and the second UI, respectively. Although the visual object 1160 and the visual object 1170 are generated in response to one drag input, the respective sizes of the visual object 1160 and the visual object 1170 may be different from each other. Since a part of the multimedia content is displayed in the first UI at the first magnification, and the multimedia content is displayed in the second UI at the second magnification different from the first magnification, the respective sizes of the visual object 1160 and the visual object 1170 may have sizes corresponding to the first magnification and the second magnification, respectively.

Figure 12A:
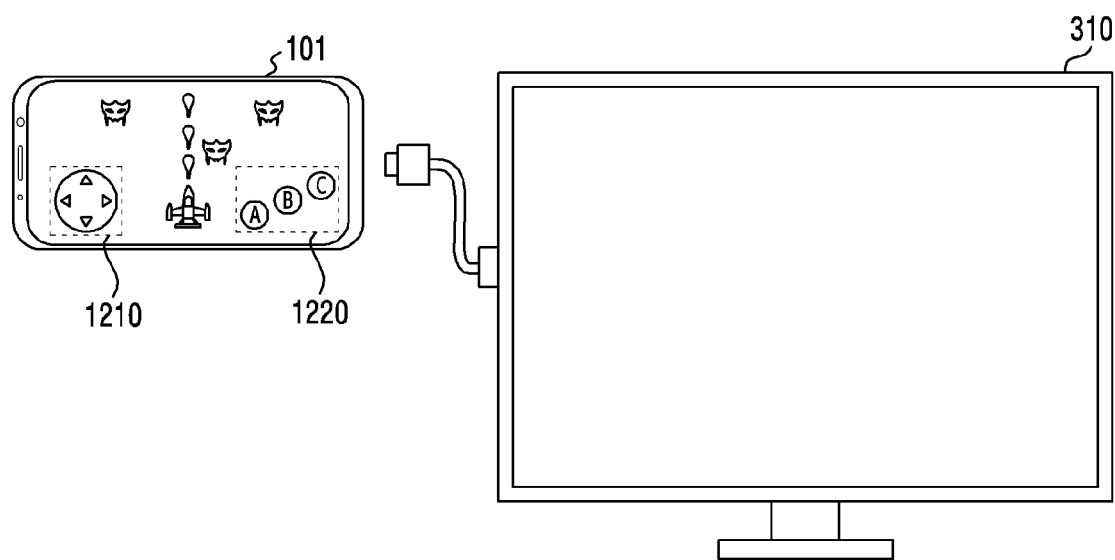
FIG. 12A is a diagram of another example of outputting, by an electronic device, a plurality of UIs obtained from an application to a display of the electronic device and an external display, according to an embodiment.
Figure 12B:
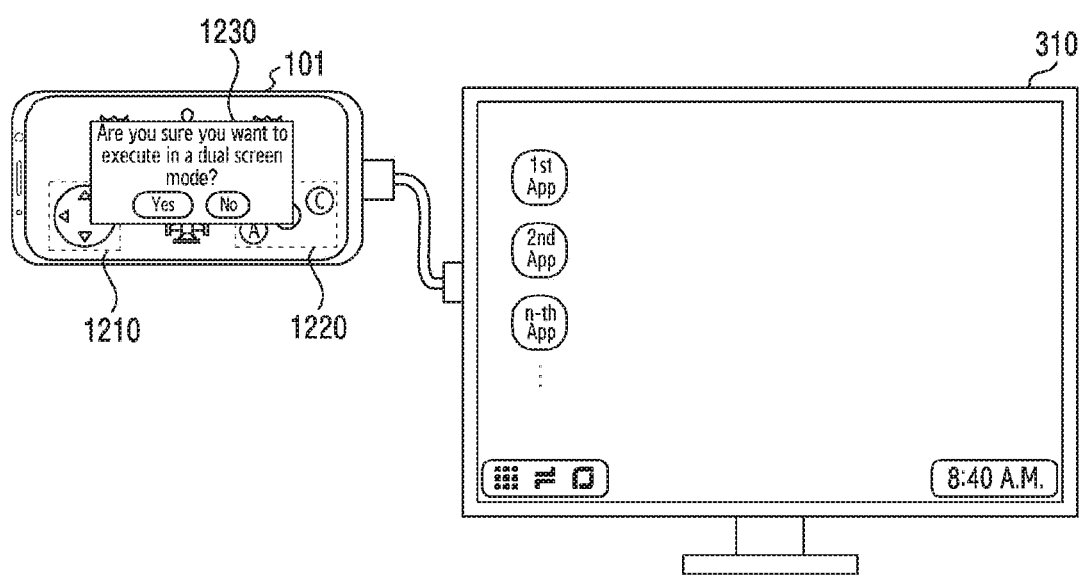
FIG. 12B is a diagram of another example of outputting, by the electronic device, the plurality of UIs obtained from the application to the display of the electronic device and the external display, according to an embodiment.
Figure 12C:
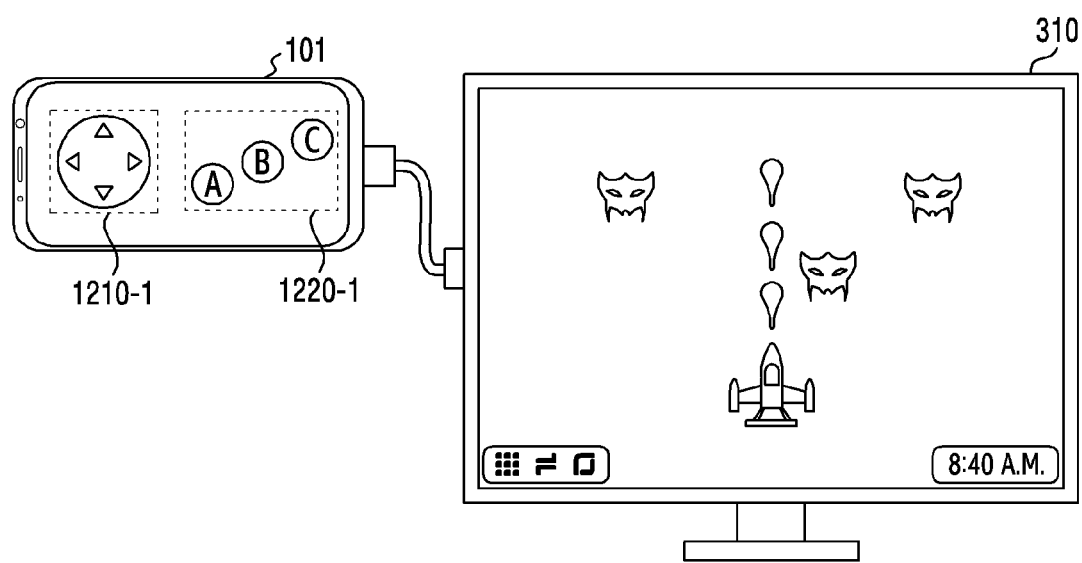
FIG. 12C is a diagram of another example of outputting, by the electronic device, the plurality of UIs obtained from the application to the display of the electronic device and the external display, according to an embodiment.

FIG. 12A is a diagram of another example of outputting, by an electronic device, a plurality of UIs obtained from an application to a display of the electronic device and an external display, according to an embodiment. FIG. 12B is a diagram of another example of outputting, by the electronic device, the plurality of UIs obtained from the application to the display of the electronic device and the external display, according to an embodiment. FIG. 12C is a diagram of another example of outputting, by the electronic device, the plurality of UIs obtained from the application to the display of the electronic device and the external display, according to an embodiment. The electronic device 101 of FIGS. 12A, 12B and 12C may be related to the electronic device 101 of FIG. 1 and FIG. 3A. Operations of the electronic device 101 of FIGS. 12A, 12B, and 12C may be related to at least one of the steps of FIG. 10. The external display of the electronic device 101 of FIGS. 12A, 12B, and 12C may be related to the external display 310 of FIGS. 3A and 3B.

Referring to FIG. 12A, before the electronic device 101 and the external display 310 are connected with each other, the electronic device 101 may output a first UI identified from an application in the display of the electronic device 101. The user may control the application which is running in the electronic device 101 by using the first UI. The user may control the application by touching visual objects 1210, 1220 on the first UI. When the application corresponds to game software, the visual objects 1210, 1220 may correspond to a controller for controlling movement of another visual object in the application.

Referring to FIG. 12B, after the electronic device 101 and the external display 310 are connected with each other, the electronic device 101 may control the display of the electronic device 101 and the external display 310 simultaneously. The electronic device 101 controlling the external display 310 and the display of the electronic device 101 simultaneously may be related to step 420 of FIG. 4 or steps after step 420. The electronic device 101 may output a UI for selecting an application to be executed in the external display 310 (e.g., a home screen generated based on a size or type of the external display 310) on the external display 310, based on an operating system which is running in the electronic device 101.

When the application running in the electronic device 101 is able to control the display of the electronic device 101 and the external display 310 simultaneously, the electronic device 101 may inform the application outputting the first UI of the connection between the electronic device 101 and the external display 310. The electronic device 101 may output, on the first UI, a visual object 1230 for obtaining determination of whether the user wishes to control the display of the electronic device 101 and the external display 310 simultaneously based on one application. The visual object 1230 may inform the user that the application can be controlled by using the display of the electronic device 101 and the external display 310 simultaneously, by using a text message, an icon, or a button.

Referring to FIG. 12C, when an input related to the visual object 1230 and for controlling the display of the electronic device 101 and the external display 310, simultaneously, (e.g., an input of touching the "Yes" button on the visual object 1230 of FIG. 12B) is received from the user, the electronic device 101 may control both the display of the electronic device 101 and the external display 310 based on the application related to the first UI. When the application corresponds to game software, the application outputs visual objects 1210-1, 1220-1 related to controlling by the user in the display of the electronic device 101, and may output an image generated in response to the user control in the external display 310. The sizes of the visual objects 1210-1, 1220-1 may be different from the sizes of the visual objects 1210, 1220 provided to the user before the display of the electronic device 101 and the external display 310 are connected.

There may be various embodiments in which the external display 310 and the electronic device 101 are used cooperatively according to a type of an application running in the electronic device 101, in addition to the case in which the electronic device 101 executes the application for editing an image as shown in FIGS. 9A, 9B, 9C, and 9D, and the case in which the electronic device 101 executes the application related to a game as shown in FIGS. 12A, 12B, and 12C.

When the electronic device 101 executes an application for streaming a video, the electronic device 101 may display the streaming video on the external display 310, while outputting at least one of users' comments related to the video, or an interface controlling playback of the video, and information related to a subject of the video on the display of the electronic device 101.

When the electronic device 101 executes an application for shopping for products, the electronic device 101 may output a variety of information (e.g., price, details, rating, name, etc.) related to a product on the display of the electronic device 101 at the same time as outputting an image of the product on the external display 310.

When the electronic device 101 executes an application for editing a slide, the electronic device 101 may output a part of the slide on the display of the electronic device 101 at the same time as outputting the entire slide on the external display 310.

Figure 13:
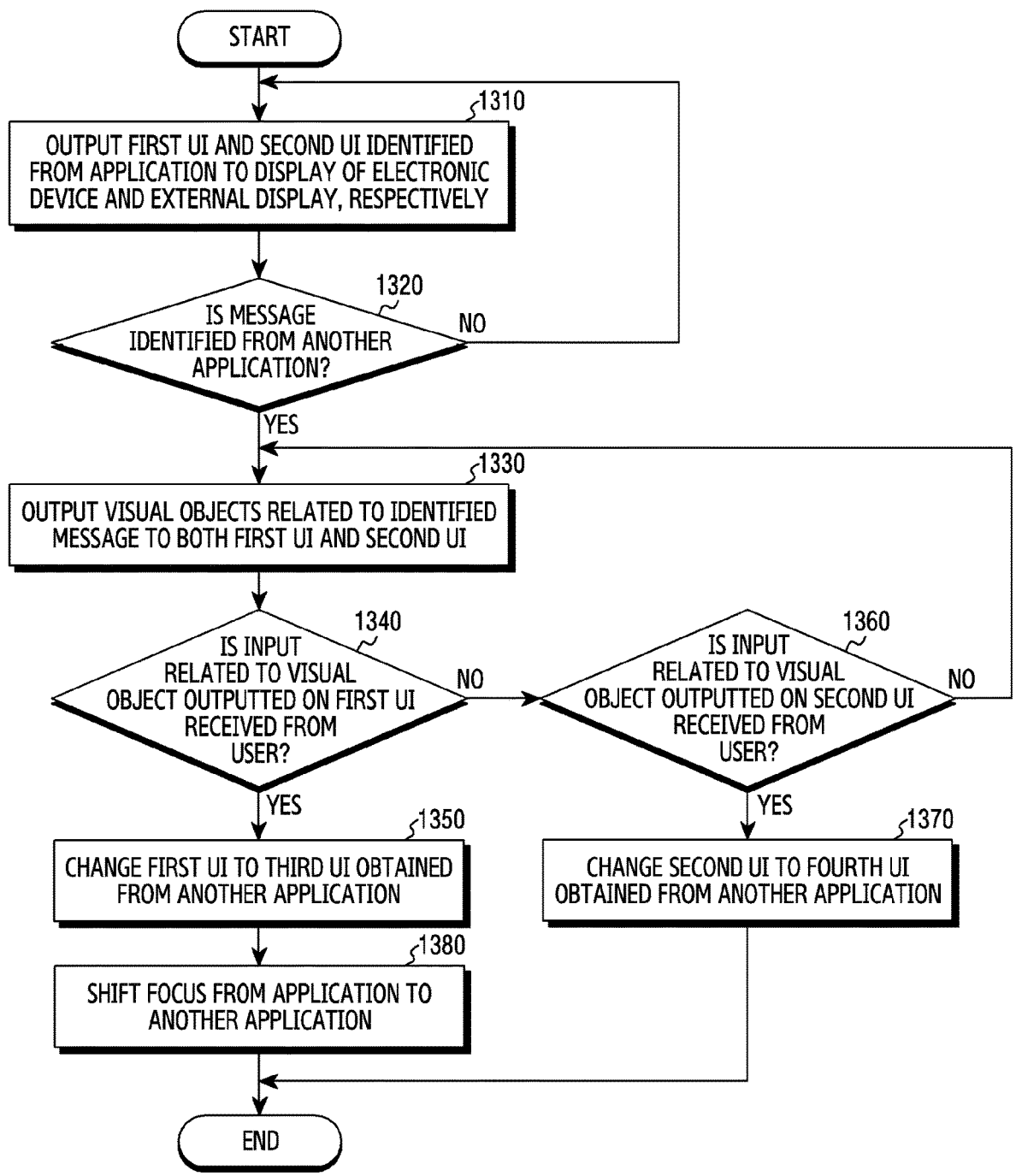
FIG. 13 is a flowchart of a method of, while executing an application by using both a display of an electronic device and an external display, executing by the electronic device, another application different from the application, according to an embodiment.

FIG. 13 is a flowchart of a method of, while executing an application by using both a display of an electronic device and an external display, executing, by the electronic device, another application different from the application, according to an embodiment. The electronic device of FIG. 13 may correspond to the electronic device 101 of FIG. 1 and FIGS. 3A and 3B. Steps of FIG. 13 may be executed by the electronic device 101 of FIG. 1 and FIGS. 3A and 3B, or the processor 120 of the electronic device 101 of FIG. 1 and FIGS. 3A and 3B. The steps of FIG. 13 may be related to step 460 of FIG. 4.

Referring to FIG. 13, at step 1310, the electronic device may output a first UI and a second UI identified from a running application to the display of the electronic device and the external display, respectively. Step 1310 may be performed based on step 460 of FIG. 4.

While outputting the first UI and the second UI to the display of the electronic device and the external display, respectively, the electronic device may identify a message from another application different from the application at step 1320. While the application is running, another application may be executed based on an alarm service for executing another application at a designated time or a push service for receiving a message processed by another application through a network. In response to another application being executed, the electronic device may transmit a message related to execution of another application to the application related to the first UI and the second UI.

In response to the message related to another application different from the application being identified, the electronic device may output visual object related to the identified message to the display of the electronic device and the external display, respectively, at step 1330. The visual objects may be floated on the first UI and the second UI and outputted. The sizes of the visual objects may correspond to the respective sizes of the display of the electronic device and the external display.

Referring to FIG. 13, at step 1340, the electronic device may determine whether an input related to the visual object outputted on the first UI is received from the user.

In response to the user input related to the visual object outputted in the display of the electronic device, the electronic device may convert the first UI into a third UI identified from another application at step 1350. The third UI may be generated based on at least one of the size, resolution, and operation mode (e.g., the touch mode) of the display of the electronic device.

Referring to FIG. 13, at step 1306, the electronic device may determine whether an input related to the visual object outputted on the second UI is received from the user. Step 1340 and step 1360 may be performed simultaneously by an operating system running in the electronic device, or may be performed in a different order from that of FIG. 13.

In response to the user input related to the visual object outputted in the external display, the electronic device may convert the second UI into a fourth UI identified from another application at step 1370. The fourth UI may be generated based on at least one of the size, resolution, and operation mode (e.g., the desktop mode) of the external display. The third UI and the fourth UI identified from another application may be generated based on the respective sizes of the display of the electronic device and the external display based on another application. A configuration of the third UI and a configuration of the fourth UI may be different from each other.

Referring to FIG. 13, at step 1380, the electronic device may shift a focus in the application and another application. The focus indicates an application to process a user input, and, in response to the third UI or the fourth UI identified from another application being outputted, the focus of the electronic device may be shifted from the application related to the first UI and the second UI to another application outputting the third UI or the fourth UI. After step 1380, the electronic device may process the user input based on another application.

Figure 14A:
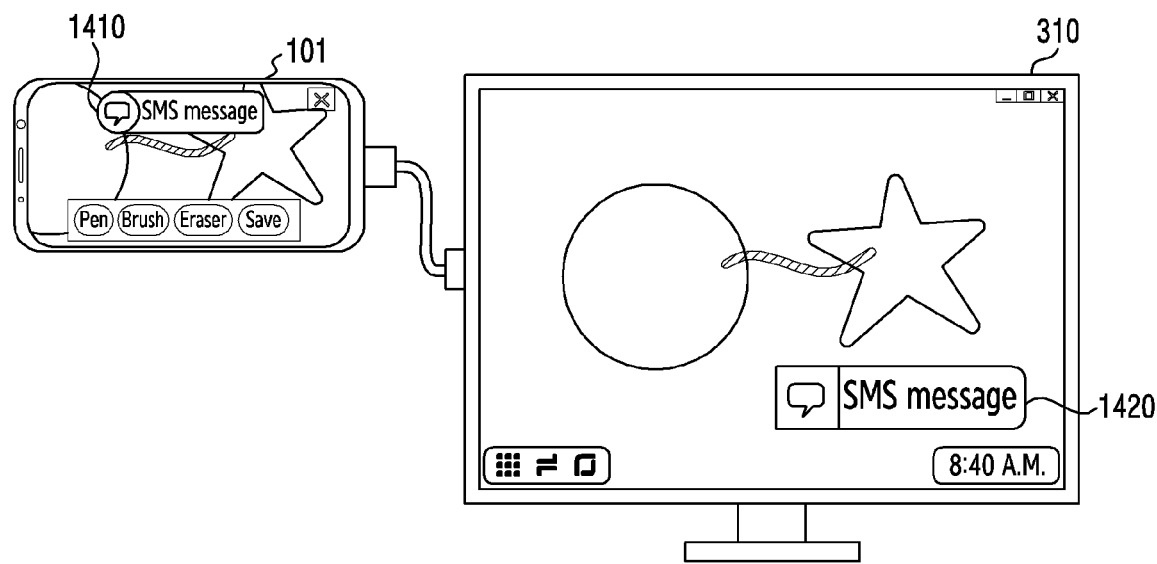
FIG. 14A is a diagram of an example in which, while executing an application by using both a display of an electronic device and an external display, the electronic device executes another application different from the application, according to an embodiment.
Figure 14B:
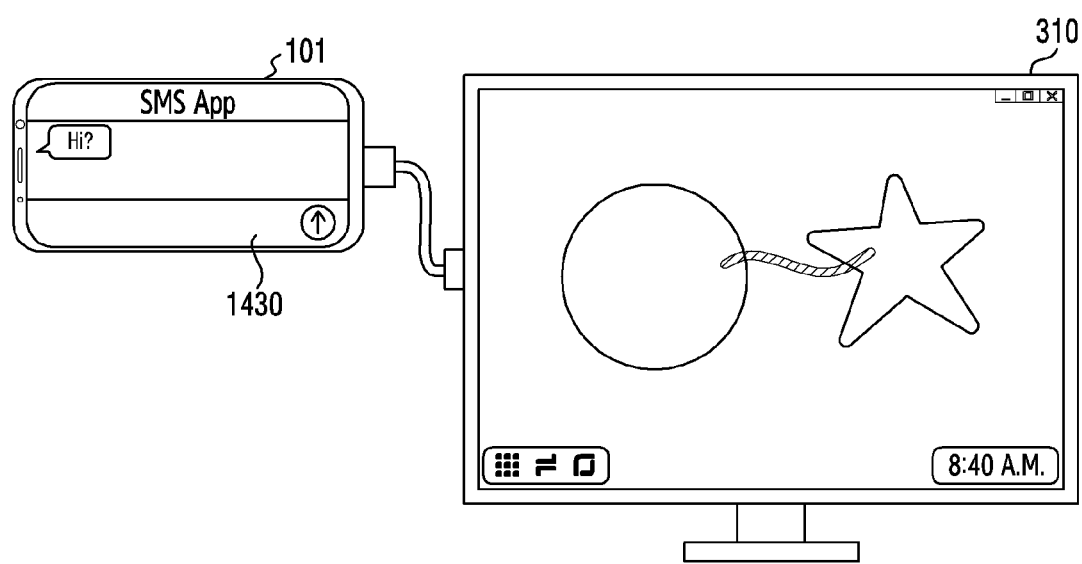
FIG. 14B is a diagram of an example in which, while executing the application by using both the display of the electronic device and the external display, the electronic device executes another application different from the application, according to an embodiment.
Figure 14C:
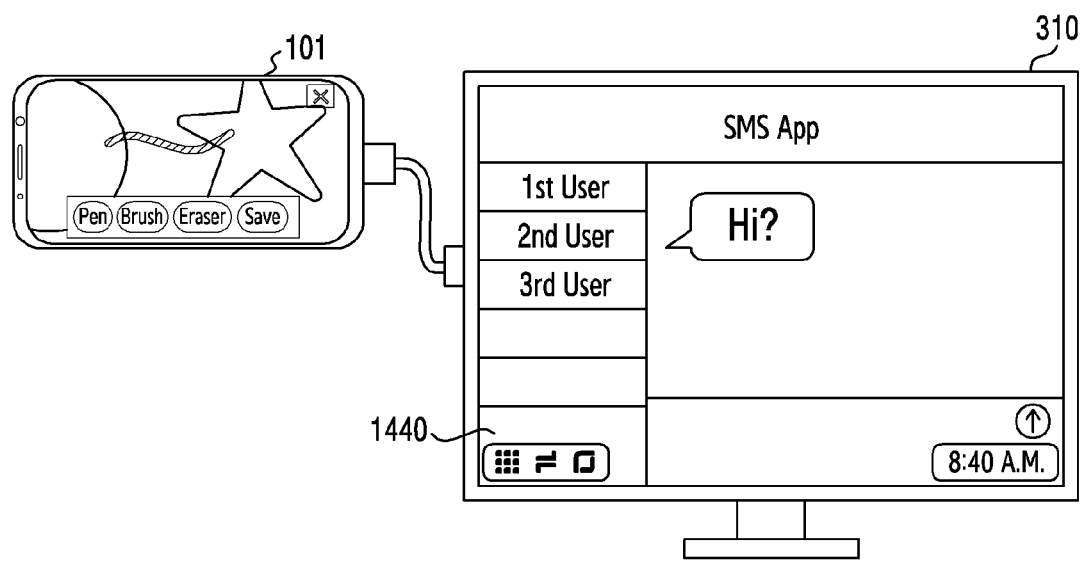
FIG. 14C is a diagram of an example in which, while executing the application by using both the display of the electronic device and the external display, the electronic device executes another application different from the application, according to an embodiment.

FIG. 14A is a diagram of an example in which, while executing an application by using both a display of an electronic device and an external display, the electronic device executes another application different from the application, according to an embodiment. FIG. 14B is a diagram of an example in which, while executing the application by using both the display of the electronic device and the external display, the electronic device executes another application different from the application, according to an embodiment. FIG. 14C is a diagram of an example in which, while executing the application by using both the display of the electronic device and the external display, the electronic device executes another application different from the application, according to an embodiment. The electronic device 101 of FIGS. 14A, 14B, and 14C may be related to the electronic device 101 of FIG. 1 and FIG. 3A. Operations of the electronic device 101 of FIGS. 14A, 14B, and 14C may be related to at least one of the steps of FIG. 13. The external display of FIGS. 14A, 14B, and 14C may be related to the external display 310 of FIGS. 3A and 3B.

Referring to FIG. 14A, the electronic device 101 may display a part of a multimedia content on the display of the electronic device 101 at a first magnification by using an image edit application for editing an image executed by the processor of the electronic device 101. The part of the multimedia content displayed at the first magnification may be included in a first UI identified from the application executed by the processor of the electronic device 101. In response to a connection between the external display 310, different from the display of the electronic device 101, and the electronic device 101, the electronic device 101 may display the multimedia content on the external display 310 at a second magnification different from the first magnification by using the application. The multimedia content displayed at the second magnification may be included in a second UI identified from the application executed by the processor of the electronic device 101.

While outputting the first UI and the second UI identified from the application executed by the processor to the display of the electronic device 101 and the external display 310, respectively, the electronic device 101 may identify a message from another application (e.g., a short message service (SMS) application related to the SMS). The electronic device 101 identifying the message from another application may be performed based on step 1320 of FIG. 13. The message may be obtained from another application which is running in the background. The message may be obtained from another application which is executed based on an alarm service or push service.

Referring to FIG. 14A, in response to the message identified from another application, the electronic device 101 may output visual objects 1410, 1420 floated on the first UI and the second UI, respectively. Outputting the visual objects 1410, 1420 may be performed based on step 1330 of FIG. 13. The visual objects 1410, 1420 may include at least one of a text, an icon, and an image related to the message identified from another application. The visual objects 1410, 1420 may be independently generated based on at least one of the size, resolution, and operation mode of a corresponding display. Layouts of the visual objects 1410, 1420 may vary according to at least one of the size, resolution, and operation mode of a corresponding display.

The user may command the electronic device 101 to switch from the currently running application to another application related to the message by touching the visual object 1410 outputted in the display of the electronic device 101. The user may command the electronic device 101 to switch from the currently running application to another application related to the message by clicking the visual object 1420 outputted in the external display 310.

When the user input related to any one of the visual objects 1410, 1420 is received, the electronic device 101 may output a UI identified from another application in one of the external display 310 and the display of the electronic device 101 that includes the visual object corresponding to the received input.

FIG. 14B illustrates an example in which, in response to the user input related to the visual object 1410 outputted in the display of the electronic device 101, the electronic device 101 outputs the UI identified from another application in the display of the electronic device 101. The operation of FIG. 14B may be performed based on step 1340 and step 1350 of FIG. 13. Referring to FIG. 14B, the electronic device 101 may change the first UI identified from the application and outputted in the display of the electronic device 101 to a third UI 1430 identified from another application. The third UI 1430 may be generated based on at least one of the size, resolution of the display of the electronic device 101, and the operation mode (e.g., the touch mode) related to the display of the electronic device 101.

In response to the first UI being changed to the third UI 1430, the electronic device 101 may shift the focus from the application related to the first UI to another application related to the third UI 1430. Shifting the focus may be performed based on step 1380 of FIG. 13. After the focus is shifted to another application related to the third UI 1430, a user input performed in the second UI outputted through the external display 310 may not be processed by the application related to the second UI. After the focus is shifted to another application related to the third UI 1430, in response to a user input performed in the second UI outputted through the external display 310, the electronic device 101 may shift the focus from another application related to the third UI 1430 back to the application related to the second UI.

FIG. 14C is a view illustrating an example in which, in response to the user input related to the visual object 1430 outputted in the external display 310, the electronic device 101 outputs a UI identified from another application in the external display 310. The operation of FIG. 14C may be performed based on step 1360 and step 1370 of FIG. 13. Referring to FIG. 14C, the electronic device 101 may change the second UI identified from the application and outputted in the external display 310 to a fourth UI 1440 identified from another application. The fourth UI 1440 may be generated based on at least one of the size, resolution of the external display 310 and the operation mode related to the external display 310 (e.g., the desktop mode).

In response to the second UI being changed to the fourth UI 1440, the electronic device 101 may output a visual object which is floated on the first UI and allows the application outputted in the display of the electronic device 101 to output the second UI again (e.g., the visual object 520 of FIG. 5B).

In response to the second UI being changed to the fourth UI 1440, the electronic device 101 may shift the focus from the application related to the second UI to another application related to the fourth UI 1440. Shifting the focus may be performed based on step 1380 of FIG. 13.

After the focus is shifted to another application related to the fourth UI 1440, a user input performed in the first UI outputted through the display of the electronic device 101 may not be processed by the application related to the first UI, and may be processed by another application related to the fourth UI 1440. In this case, since the user input performed in the first UI is identified outside the fourth UI 1440, the electronic device 101 may discard the user input identified outside the fourth UI 1440 based on another application. Alternatively, in response to the user input identified outside the fourth UI 1440 (e.g., the user input identified in the first UI) based on another application, the electronic device 101 may shift the focus to the application related to the UI including the user input.

The electronic device may directly control the external display in response to the external display being connected with the electronic device by the user. When an application running in the electronic device is able to use the display of the electronic device and the external display simultaneously, the electronic device may output a plurality of UIs obtained from the application to the display of the electronic device and the external display, simultaneously. The electronic device outputting the plurality of UIs to the display of the electronic device and the external display simultaneously may be performed in response to a user input related to a visual object floated on the UI outputted in the display of the electronic device.

The plurality of UIs obtained by the electronic device from one application may have different configurations. When the application displays a multimedia content, the UI outputted from the display of the electronic device may display a part of the multimedia content based on a first magnification, and the UI outputted from the external display may display the entire multimedia content based on a second magnification. The first magnification and the second magnification may be different from each other, and the user may selectively change any one of the first magnification and the second magnification.

Figure 15:
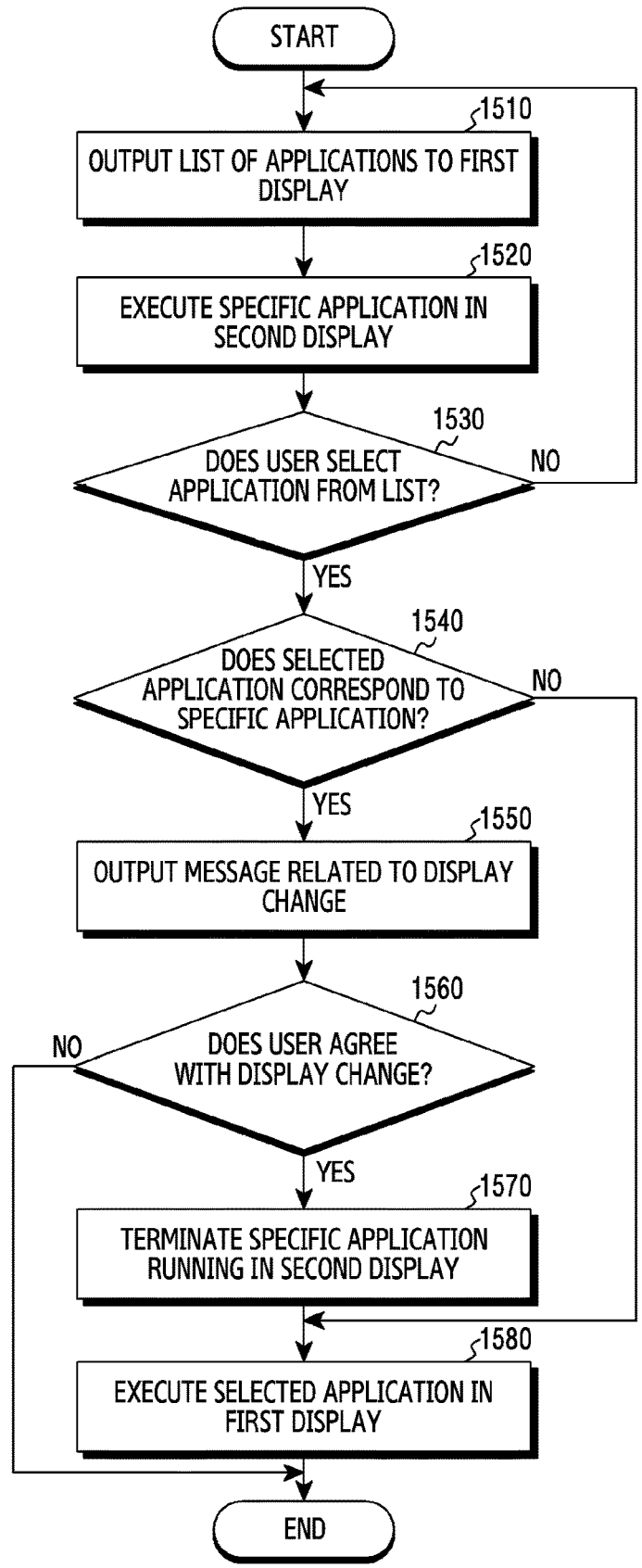
FIG. 15 is a flowchart of a method performed by an electronic device to execute an application executed in any one of a plurality of displays in another display, according to an embodiment.

FIG. 15 is a flowchart of a method performed by an electronic device to execute an application executed in any one of a plurality of displays in another display, according to an embodiment. The electronic device of FIG. 15 may be related to the electronic device 101 of FIG. 1 and FIGS. 3A and 3B. Steps of FIG. 15 may be performed by the electronic device 101 of FIG. 1 and FIGS. 3A and 3B or by the processor 120 of the electronic device 101 of FIG. 1 and FIGS. 3A and 3B.

Referring to FIG. 15, at step 1510, the electronic device may output a list of applications installed in the electronic device to a first display among the plurality of displays. The first display may correspond to a display of the electronic device. The list of applications may be included in a UI (e.g., a home screen or a desktop screen) identified from an operating system of the electronic device.

Referring to FIG. 15, at step 1520, the electronic device may execute a specific application among the applications installed in the electronic device in a second display among the plurality of displays. The electronic device may output a UI identified from the specific application on the second display. The second display may correspond to an external display connected with the electronic device.

Referring to FIG. 15, at step 1530, the electronic device may determine whether the user selects at least one application from the list of applications of the first display. The user may touch any one of the plurality of applications outputted on the first display.

When the user selects at least one application from the list of applications of the first display, the electronic device may determine whether the application selected by the user corresponds to the specific application executed in the second display at step 1540.

When the application selected by the user does not correspond to the specific application executed in the second display, the electronic device may execute the selected application based on the first display at step 1580. The electronic device may change the list of applications outputted in the first display based on step 1510 to a UI identified from the selected application.

When the application selected by the user corresponds to the specific application executed in the second display, the electronic device may output a message related to a display change of the specific application running in the second display at step 1550. The electronic device may output a message asking the user whether to execute the specific application running in the second display in the first display. The message may be outputted based on at least one of a text, an icon, an image, and a button on the first display or the second display.

After outputting the message, the electronic device may determine whether the user agrees with the message for shifting the specific application from the second display to the first display at step 1560. When the user does not agree with the message, the electronic device may not shift the specific application from the second display to the first display, and may continue executing the specific application in the second display.

When the user agrees with the message, such as when the user agrees that the specific application is shifted from the second display to the first display and is executed, the electronic device may terminate the specific application which is running in the second display at step 1570. When the specific application is terminated, data or context which is accumulated while the specific application is executed in the second display may be stored in the electronic device. As the specific application running in the second display is terminated, the electronic device may change the UI outputted in the second display from the UI identified from the specific application to the UI identified from the operating system of the electronic device (e.g., the home screen or the desktop screen).

Referring to FIG. 15, at step 1580, the electronic device may execute the application selected in the first display. When the user selects the application running in the second display, the electronic device may execute the specific application terminated by step 1570 in the first display. The specific application may be executed based on the data or context stored at step 1570. The electronic device may change the UI outputted in the first display from the UI identified from the operating system (e.g., the home screen or desktop screen) to the UI identified from the specific application.

Figure 16A:
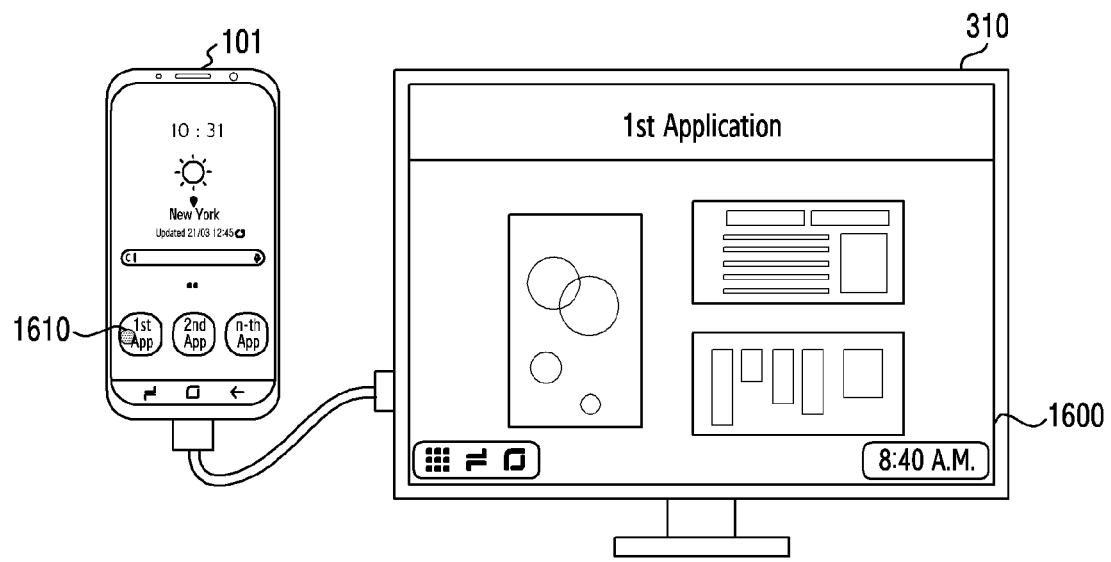
FIG. 16A is a diagram of an example in which an electronic device executes an application executed in any one of a plurality of displays in another display, according to an embodiment.
Figure 16B:
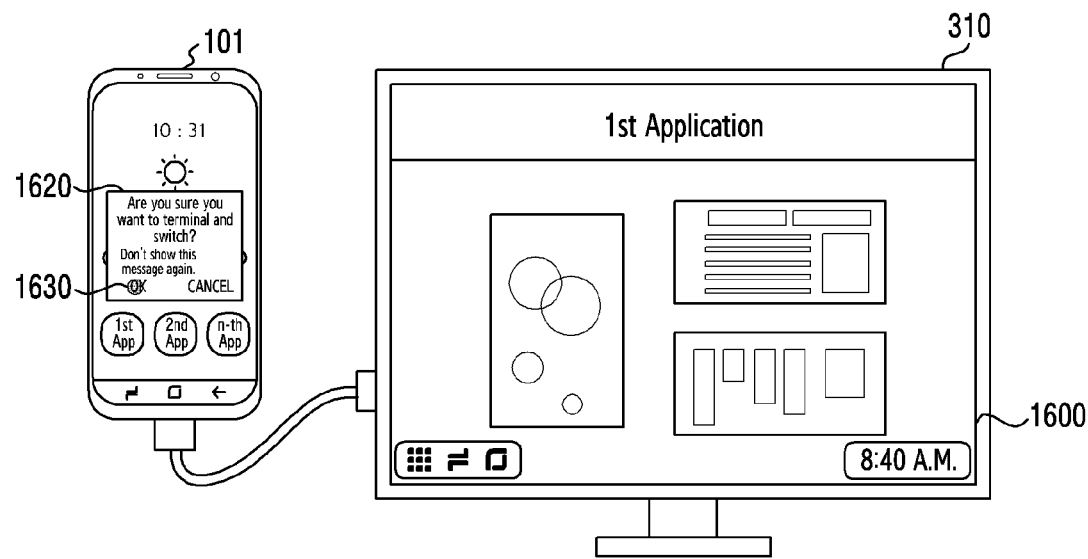
FIG. 16B is a diagram of an example in which the electronic device executes the application executed in any one of the plurality of displays in another display, according to an embodiment.
Figure 16C:
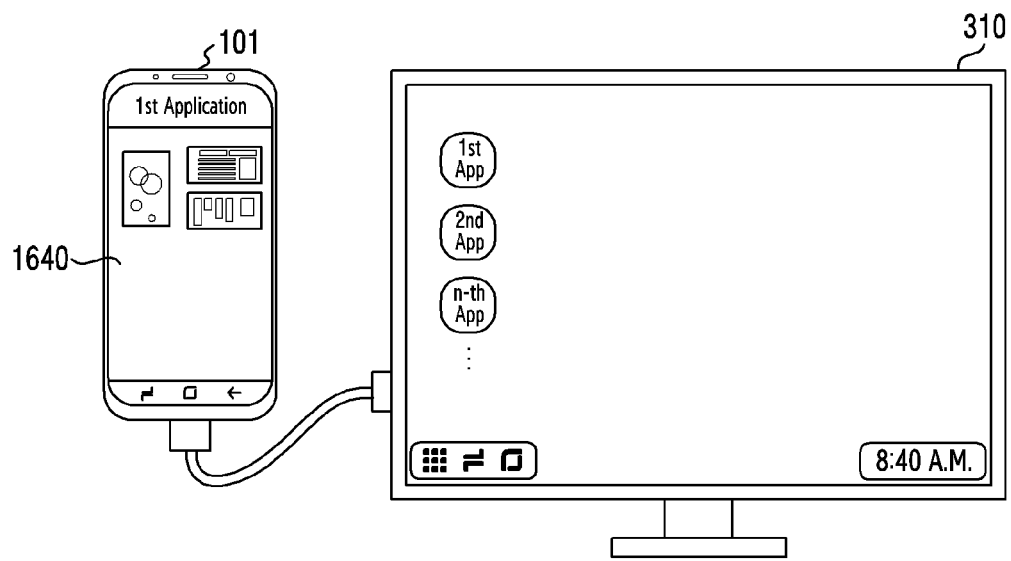
FIG. 16C is a diagram of an example in which the electronic device executes the application executed in any one of the plurality of displays in another display, according to an embodiment.

FIG. 16A is a diagram of an example in which an electronic device executes an application executed in any one of a plurality of displays in another display, according to an embodiment. FIG. 16B is a diagram of an example in which the electronic device executes the application executed in any one of the plurality of displays in another display, according to an embodiment. FIG. 16C is a diagram of an example in which the electronic device executes the application executed in any one of the plurality of displays in another display, according to an embodiment. The electronic device 101 of FIGS. 16A, 16B, and 16C may be related to the electronic device 101 of FIGS. 1 and 3A. The operations of the electronic device 101 of FIGS. 16A, 16B, and 16C may be related to at least one of the steps of FIG. 15. An external display of FIGS. 16A, 16B, and 16C may be related to the external display 310 of FIGS. 3A and 3B.

Referring to FIG. 16A, based on step 1510 and step 1520 of FIG. 15, the electronic device 101 may output a UI 1600 identified from a first application in the external display 310, and may output a UI (e.g., a home screen) including a list of applications identified from the operating system in the display of the electronic device 101. The UI 1600 outputted in the external display 310 may be generated based on at least one of a size of the external display 310 and an operation mode (e.g., a desktop mode) corresponding to the external display 310. The user may control the first application based on the UI 1600 outputted in the external display 310.

The user may select at least one of the applications outputted in the display of the electronic device 101, and may select an application to be executed through the display of the electronic device 101. The user may command the electronic device 101 to execute the first application through the display of the electronic device 101 by touching a region 1610 related to the first application in the list of applications. Based on step 1530 and step 1540 of FIG. 15, the electronic device 101 may detect that the user selects the first application executed in the external display 310.

Referring to FIG. 16B, when it is detected that the user selects the first application executed in the external display 310, the electronic device 101 may output a message 1620 related to a display shift of the first application executed in the external display 310 from the external display 310 to the display of the electronic device 101. The electronic device 101 may output the message 1620 in the display of the electronic device 101 based on step 1550 of FIG. 15. While the message 1620 is being outputted, the electronic device 101 may continue outputting the UI 1600 identified from the first application in the external display 310.

The message 1620 may be floated on the UI identified from the operating system in the display of the electronic device 101. The message 1620 may include one or more icons or buttons for receiving determination regarding whether to shift the display from the user. When the user touches a button 1630 agreeing with the display shift, the electronic device 101 may shift the first application running in the external display 310 to the display of the electronic device 101 based on at least one of steps 1560 to 1580 of FIG. 15.

Referring to FIG. 16C, the electronic device 101 may output a UI 1640 identified from the first application in the display of the electronic device 101. The UI 1640 outputted in the display of the electronic device 101 may be different from the UI 1600 outputted in the external display 310 of FIGS. 16A and 16B. The UI 1640 outputted in the display of the electronic device 101 may be generated based on at least one of a size of the display and an operation mode (e.g., a touch mode) corresponding to the display.

As the first application running in the external display 310 is shifted to the display of the electronic device 101, the electronic device 101 may output the UI (e.g., the desktop screen) identified from the operating system of the electronic device 101 and including the list of applications installed in the electronic device 101 in the external display 310. When the user selects a certain application from the list of applications outputted in the external display 310, the electronic device 310 may execute the selected application in the external display 310. When the user selects the first application again, the electronic device 101 may perform the operation of shifting the first application running in the display of the electronic device 101 to the external display 310 based on the steps of FIG. 15.

Figure 17A:
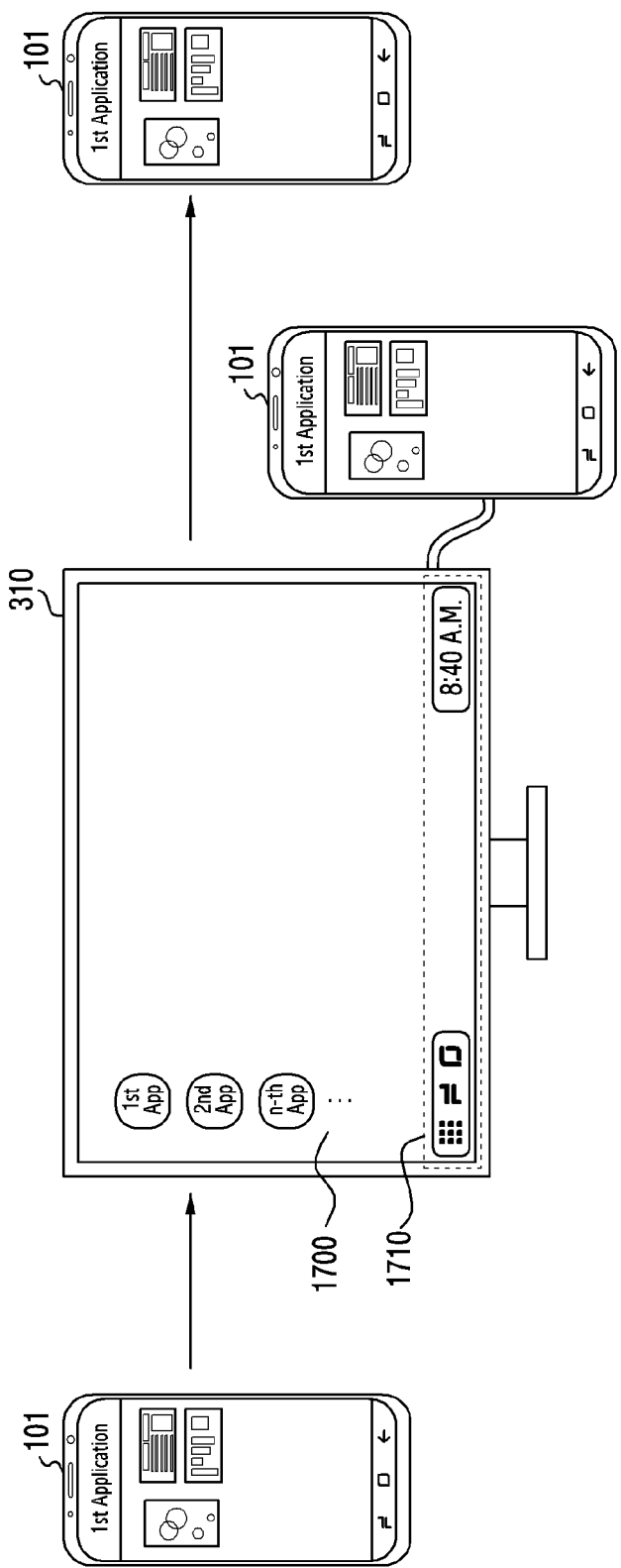
FIG. 17A is a diagram of an example in which an electronic device adjusts a UI of one or more running applications in response to a connection with an external display, according to an embodiment.
Figure 17B:
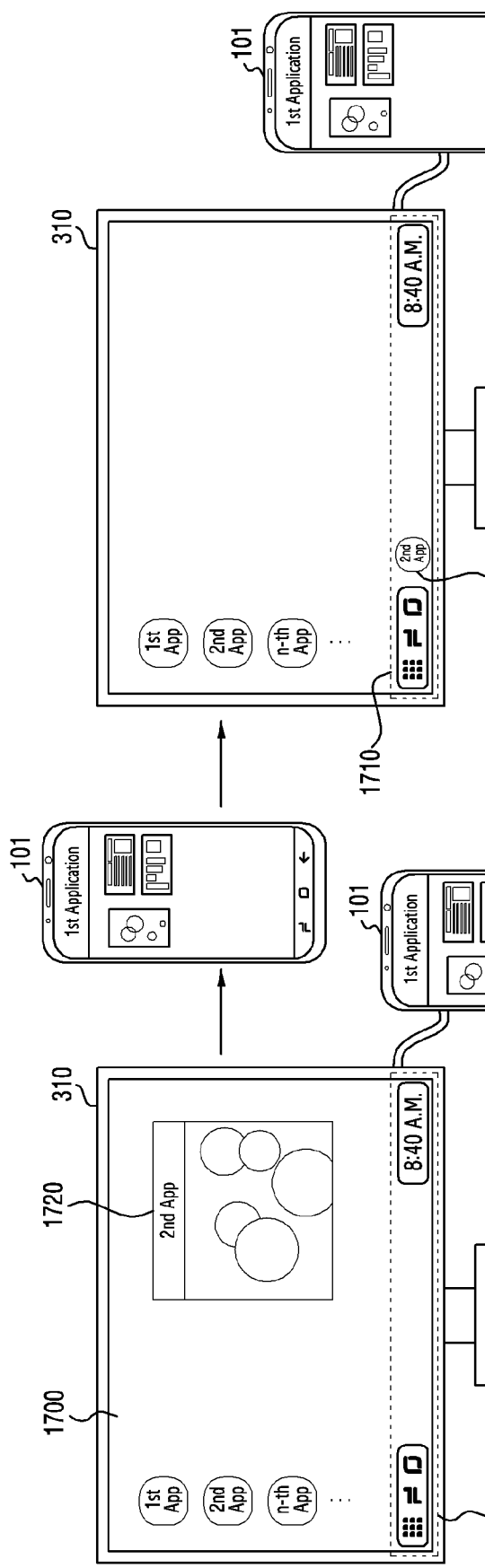
FIG. 17B is a diagram of an example in which the electronic device adjusts the UI of the one or more running applications in response to the connection with the external display, according to an embodiment.

FIG. 17A is a diagram of an example in which an electronic device adjusts a UI of one or more running applications in response to a connection with an external display, according to an embodiment. FIG. 17B is a diagram of an example in which the electronic device adjusts the UI of the one or more running applications in response to the connection with the external display, according to an embodiment. The electronic device 101 of FIGS. 17A and 17B may correspond to the electronic device 101 of FIG. 1 and FIGS. 3A and 3B. The external display 310 of FIGS. 17A and 17B may correspond to the external display 310 of FIGS. 3A and 3B.

When the electronic device 101 and the external display 310 are connected with each other, the electronic device 101 may determine a UI to be outputted through the external display 310 based on any one of designated operation modes. The designated operation modes may include at least one of: (1) a mirroring mode in which an image outputted in the display of the electronic device 101 is scaled and outputted in the external display 310, and (2) a dual mode in which a UI outputted in the display of the electronic device is extended. In the dual mode, a drag input by a mouse point connected to the electronic device 101 or by a user may continuously move from a certain boundary of the display of the electronic device 101 to a certain boundary of the external display 310.

FIG. 17A illustrates an example of a UI outputted by the electronic device 101 operating in the dual mode in response to a connection with the external display 310, and FIG. 17B illustrates another example of the UI outputted by the electronic device 101 operating in the dual mode in response to the connection with the external display 310. Referring to FIG. 17A, a situation when the external display 310 is connected with the electronic device 101 executing a first application, and a situation before the connection are illustrated.

Before the external display 310 is connected to the electronic device 101, the electronic device 101 may output a UI identified from the first application on the display of the electronic device 101. The first application may operate based on an operation mode (e.g., a touch mode) corresponding to the display of the electronic device 101.

Referring to FIG. 17A, while the external display 310 is connected with the electronic device 101, the electronic device 101 may output a UI 1700 (e.g., a desktop screen identified from the operating system of the electronic device 101) different from the UI outputted on the display of the electronic device 101 on the external display 310 based on the dual mode. The UI 1700 outputted through the external display 310 may include a list of applications installed in the electronic device 101.

The electronic device 101 may output the list of one or more applications running in the desktop mode in a partial region 1710 of the UI 1700. Since the first application is executed based on the touch mode in the display of the electronic device 101, the electronic device 101 may not output a visual object (e.g., an icon or a preview of the first application) corresponding to the first application in the partial region. When the user executes an application in the external display 310, the electronic device 101 may execute the application based on the desktop mode. In this case, the electronic device 101 may output a visual object corresponding to the application running based on the desktop mode in the partial region 1710 of the external display 310.

Referring to FIG. 17A, after the external display 310 is disconnected from the electronic device 101, the electronic device 101 may maintain the display of the first application executed on the display of the electronic device 101. When there is an application running in the external display 310, the electronic device 101 may stop displaying the application running in the external display 310.

Referring to FIG. 17B, while the external display 310 is connected with the electronic device 101, the user may execute a second application in the external display 310. The electronic device 101 may output a UI 1720 identified from the second application in the external display 310. In this case, the user may execute the first application by using the display of the electronic device 101 and may execute the second application by using the external display 310, simultaneously.

Referring to FIG. 17B, after the external display 310 is disconnected from the electronic device 101 may maintain the display of the first application executed on the display of the electronic device 101. The electronic device 101 may stop displaying the second application executed in the external display 310. The UI 1720 identified from the second application may not be shifted from the external display 310 to the display of the electronic device 101. As the display of the second application is stopped, the electronic device 101 may change the state of the second application to an inactivation state, such as a pause state or an idle state.

Referring to FIG. 17B, when the external display 310 is connected with the electronic device 101 again, the electronic device 101 may output a visual object 1730 corresponding to the second application (e.g., an icon or a preview of the second application) in the partial region 1710 of the external display 310. When an input related to the visual object 1730 is received from the user, the electronic device 101 may output the UI 1720 related to the second application in the external display 310 again.

Figure 18A:
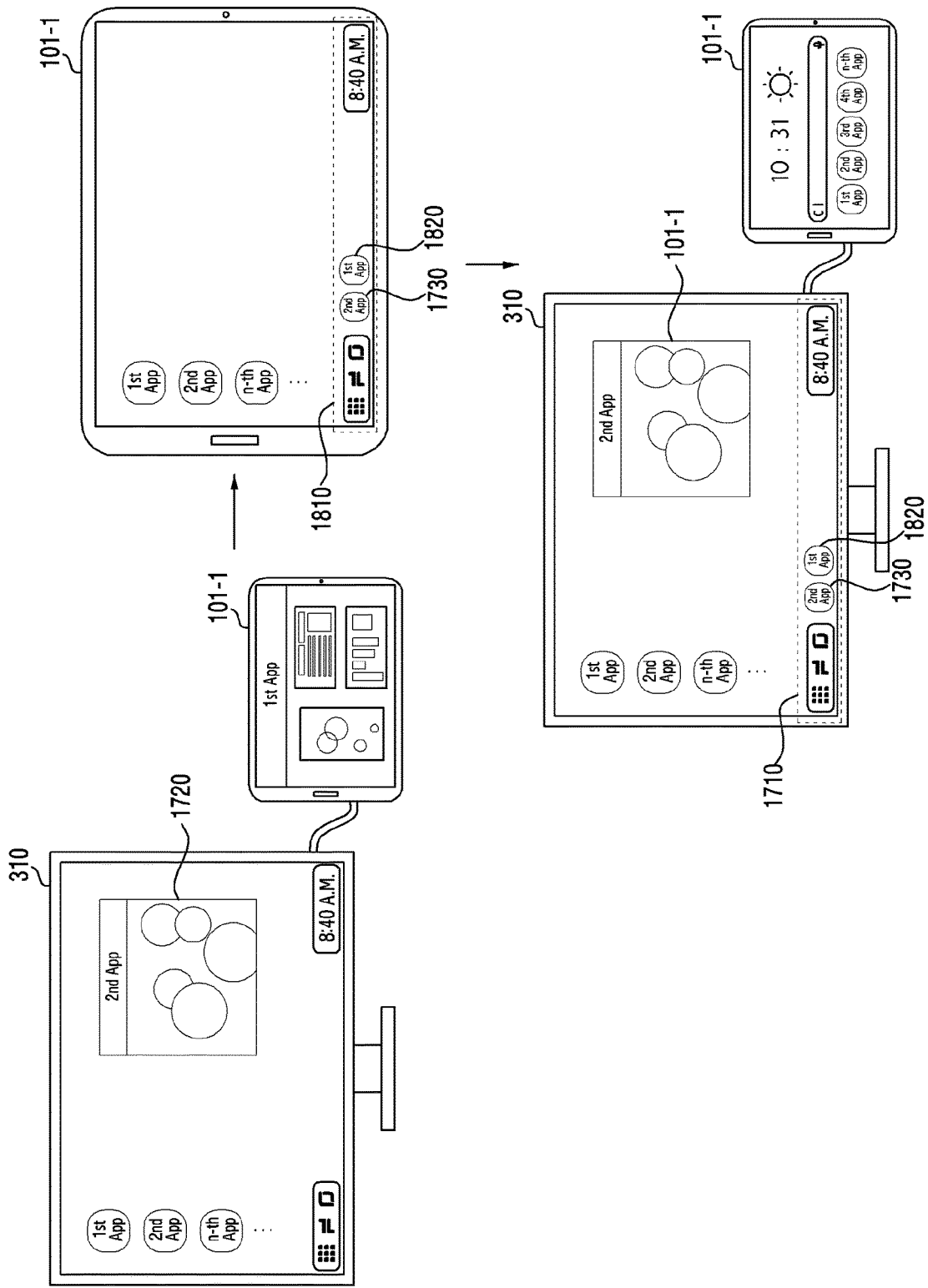
FIG. 18A is a diagram of another example in which an electronic device adjusts a UI of one or more running applications in response to a connection with an external display, according to an embodiment.
Figure 18C:
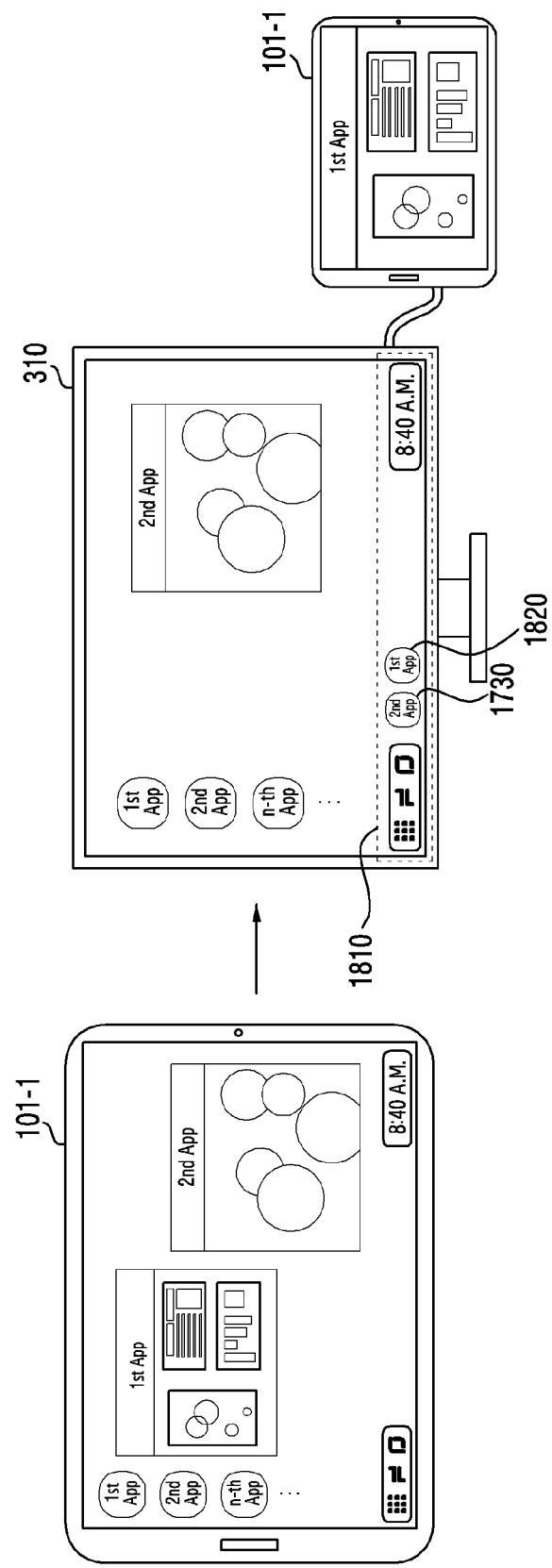
FIG. 18C is a diagram of another example in which the electronic device adjusts the UI of the one or more running applications in response to the connection with the external display, according to an embodiment.
Figure 18D:
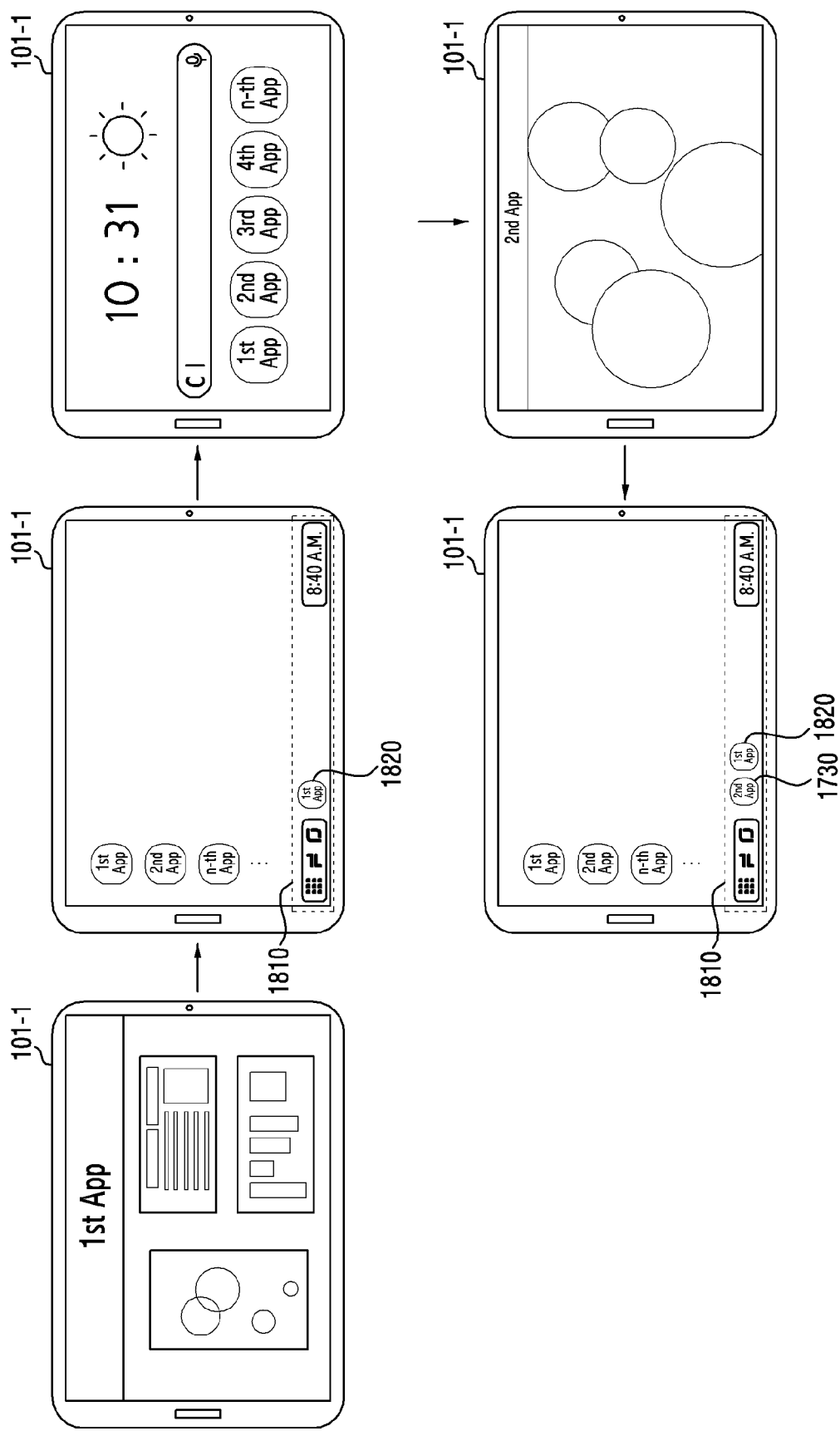
FIG. 18D is a diagram of another example in which the electronic device adjusts the UI of the one or more running applications in response to the connection with the external display, according to an embodiment.

FIG. 18A is a diagram of another example in which an electronic device adjusts a UI of one or more running applications in response to a connection with an external display, according to an embodiment. FIG. 18B is a diagram of another example in which the electronic device adjusts the UI of the one or more running applications in response to the connection with the external display, according to an embodiment. FIG. 18C is a diagram of another example in which the electronic device adjusts the UI of the one or more running applications in response to the connection with the external display, according to an embodiment. FIG. 18D is a diagram of another example in which the electronic device adjusts the UI of the one or more running applications in response to the connection with the external display, according to an embodiment. The electronic device 101-1 of FIGS. 18A, 18B, 18C, and 18D may correspond to the electronic device 101 of FIG. 1 and FIGS. 3A and 3B. The electronic device 101-1 of FIGS. 18A, 18B, 18C, and 18D may correspond to a smart pad or a tablet PC. The external display 310 of FIGS. 18A, 18B, 18C, and 18D may correspond to the external display 310 of FIGS. 3A and 3B.

Although the electronic device 101-1 according to an embodiment is not connected with the external display 310, the electronic device 101-1 may operate based on a desktop mode (e.g., a standalone desktop mode). When the size of the display of the electronic device 101-1 exceeds a designated size, the electronic device 101-1 may switch an operation mode of an application executed in the display of the electronic device 101-1 between a touch mode in which a user's touch input is considered and a desktop mode in which a keyboard or mouse input is considered.

Referring to FIG. 18A, a first application based on the touch mode may be executed in the display of the electronic device 101-1, and a second application based on the desktop mode may be executed in the external display 310 connected with the electronic device 101-1. A UI 1720 corresponding to the second application may be outputted in the external display 310.

When the user disconnects the external display 310 from the electronic device 101-1 and changes the operation mode of the electronic device 101-1 to the desktop mode, the electronic device 101-1 may output a UI (e.g., a desktop screen) identified from an operating system and based on the desktop mode. When the electronic device 101-1 operates in the desktop mode without the external display 310, the electronic device 101-1 may output a list of one or more applications running in the electronic device 101-1 in a partial region 1810 of the desktop screen.

All of the first application running in the electronic device 101-1 based on the touch mode, and the second application based on the desktop mode may be included in the list outputted in the partial region 1810. Referring to FIG. 18A, all of a visual object 1820 corresponding to the first application and a visual object 1730 corresponding to the second application may be outputted in the partial region 1810 of the desktop screen outputted in the display of the electronic device 101-1.

When the user changes the operation mode of the electronic device 101-1 to the desktop mode and then connects the external display 310 to the electronic device 101-1 again, the electronic device 101-1 may output the desktop screen in the external display 310 and may output the home screen based on the touch mode in the display of the electronic device 101-1. In this case, visual objects corresponding to the applications running in the electronic device 101-1 (e.g., the visual object 1820 corresponding to the first application and the visual object 1730 corresponding to the second application) may be outputted in the partial region 1710 of the desktop screen outputted in the external display 310.

Referring to FIG. 18B, similarly to FIG. 18A, the user may execute the first application in the display of the electronic device 101-1 and may execute the second application in the external display 310, and then may disconnect the electronic device 101-1 and the external display 310. When the user changes the operation mode of the electronic device 101-1 to the desktop mode after disconnecting the electronic device 101-1 and the external display 310, the visual objects corresponding to the applications executed in the electronic device 101-1 (e.g., the visual object 1820 corresponding to the first application and the visual object 1730 corresponding to the second application) may be outputted in the partial region 1810 of the desktop screen.

When the user changes the operation mode of the electronic device 101-1 from the desktop mode back to the touch mode, the electronic device 101-1 may output the home screen identified from the operating system and based on the touch mode in the display of the electronic device 101-1.

Referring to FIG. 18C, the user may execute the first application and the second application, simultaneously, in the electronic device 101-1 operating in the desktop mode without the external display 310. When the user connects the electronic device 101-1 and the external display 310, the electronic device 101-1 may output the home screen based on the touch mode in the display of the electronic device 101-1, and may output the desktop screen based on the desktop mode in the external display 310. The electronic device 101-1 may output the visual objects corresponding to the applications executed in the electronic device 101-1 (e.g., the visual object 1820 corresponding to the first application and the visual object 1730 corresponding to the second application) in the partial region 1810 of the desktop screen.

Referring to FIG. 18D, the electronic device 101-1 may switch between the touch mode and the desktop mode while the electronic device 101-1 is not connected with the external display 310. The electronic device 101-1 operating in the touch mode and executing the first application may change the operation mode from the touch mode to the desktop mode based on a user input. After being changed to the desktop mode, the electronic device 101-1 may output a UI identified from the operating system and based on the desktop mode (e.g., a desktop screen).

The electronic device 101-1 may output a visual object corresponding to the first application executed in the touch mode (e.g., an icon or preview) in the partial region 1810 of the UI identified from the operating system. While the electronic device 101-1 is not connected with the external display 310, the electronic device 101-1 may output a list of one or more applications running in the electronic device 101-1 in the partial region 1810.

After being changed to the desktop mode, the electronic device 101-1 may change the operation mode from the desktop mode back to the touch mode based on a user input. After being changed from the desktop mode back to the touch mode, the electronic device 101-1 may output a UI (e.g., a home screen) identified from the operating system and based on the touch mode. The user may execute the second application in the display of the electronic device 101-1 by touching an icon corresponding to the second application in the home screen identified from the operating system and based on the touch mode.

After the second application is executed, the electronic device 101-1 may change the operation mode from the touch mode back to the desktop mode based on a user input. Referring to FIG. 18D, after the operation mode is changed from the touch mode back to the desktop mode, the electronic device 101-1 may output the UI (e.g., the desktop screen) identified from the operating system and based on the desktop mode again. The electronic device 101-1 may output visual objects corresponding to the first application and the second application running in the electronic device 101-1 in the partial region 1810 of the desktop screen.

When the electronic device 101-1 operates in the desktop mode without the external display 310, the electronic device 101-1 may output the list of all applications running in the electronic device 101-1 in the partial region 1810 of the desktop screen identified from the operating system and outputted in the display of the electronic device 101-1. All of the application running in the electronic device 101-1 based on the touch mode, and the application based on the desktop mode may be included in the list outputted in the partial region 1810.

Figure 19:
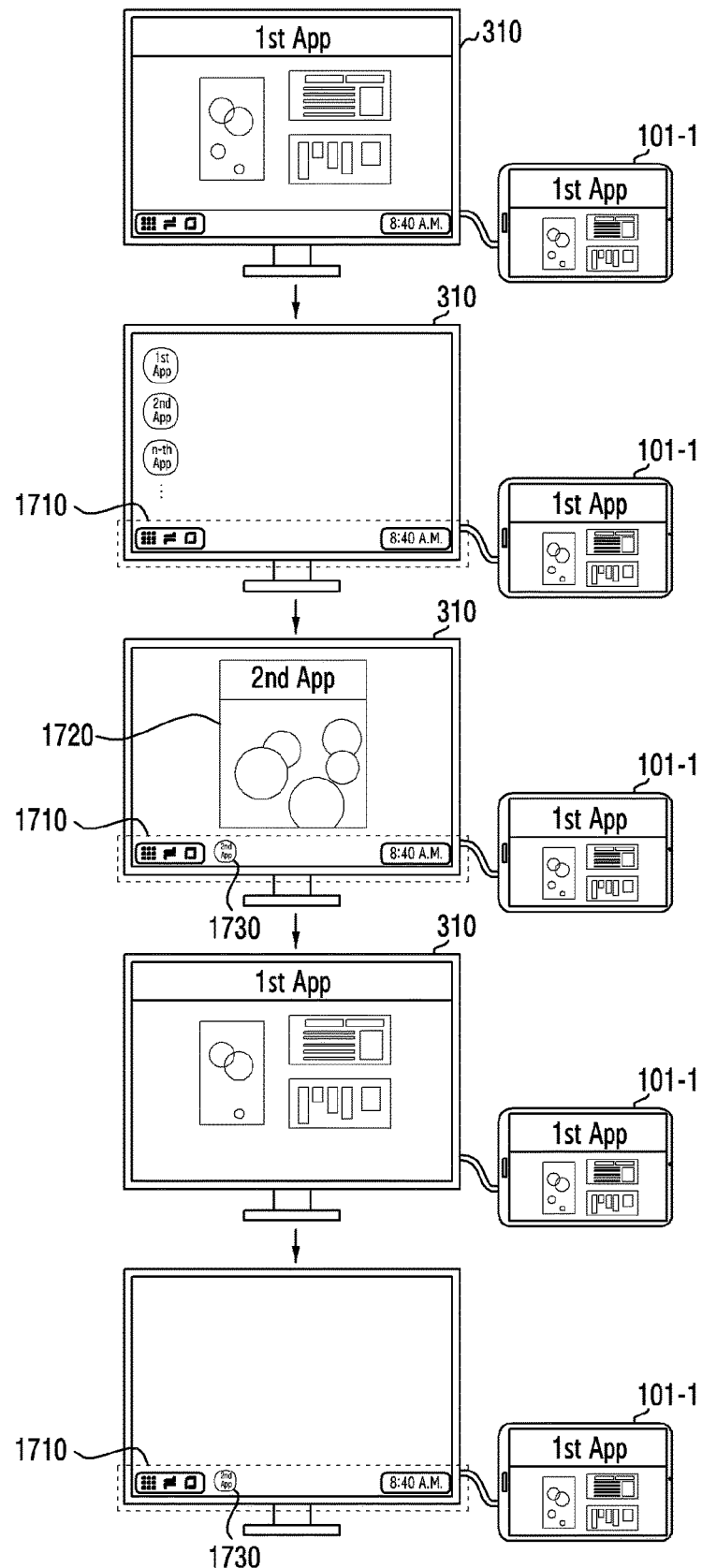
FIG. 19 is a diagram of another example in which an electronic device adjusts a UI of one or more running applications in response to a connection with the external display, according to an embodiment.

FIG. 19 is a diagram of another example in which an electronic device adjusts a UI of one or more running applications in response to a connection with the external display, according to an embodiment. The electronic device 101-1 of FIG. 19 may correspond to the electronic device 101 of FIG. 1 and FIGS. 3A to 3B. The external display 310 of FIG. 19 may correspond to the external display 310 of FIGS. 3A and 3B.

In response to a connection between the electronic device 101-1 and the external display 310, the electronic device 101-1 may determine an image to be outputted to the external display 310 based on an operation mode selected from designated operation modes. The designated operation modes may include a mirroring mode and a desktop mode. Selecting any one of the designated operation modes may be performed based on a user input (e.g., selection of an operation mode by using a control application), or a request of an application.

When the electronic device 101-1 is in the mirroring mode, the electronic device 101-1 may scale a UI of a first application running in the electronic device 101-1 according to a size of the external display 310, and may output the UI to the external display 310. In this case, the display of the electronic device 101-1 and the external display 310 may output one image obtained from the first application simultaneously.

When the user changes the operation mode of the electronic device 101—from the mirroring mode to the desktop mode, the electronic device 101-1 may output the UI of the first application to the display of the electronic device 101-1, and simultaneously, may output a UI (e.g., a desktop screen) identified from the operating system of the electronic device 101-1 in the external display 310. The display of the electronic device 101-1 and the external display 310 may output different images simultaneously. After the operation mode is changed from the mirroring mode to the desktop mode, the electronic device 101-1 may output a list of applications running based on the desktop mode in a partial region 1710 of the desktop screen.

When the user executes a second application different from the first application running in the display of the electronic device 101-1, in the desktop screen of the external display 310, the electronic device 101-1 may output a UI 1720 identified from the second application in the external display 310. The electronic device 101-1 may output the UI 1720 identified from the second application, and simultaneously, may output a visual object 1730 corresponding to the second application in the partial region 1710.

After the second application is executed in the external display 310, the user may change the operation mode of the electronic device 101-1 from the desktop mode to the mirroring mode again. Referring to FIG. 19, the electronic device 101-1 may change the image of the external display 310 from the image corresponding to the UI 1720 of the second application to the image corresponding to the UI of the first application executed in the display of the electronic device 101-1. In this case, the display of the electronic device 101-1 and the external display 310 may output one image obtained from the first application simultaneously.

When the user changes the operation mode of the electronic device 101-1 from the mirroring mode to the desktop mode again, the electronic device 101-1 may output the desktop screen in the external display 310 again. Because the second application has been executed, the electronic device 101-1 may output the visual object 1730 corresponding to the second application in the partial region 1710 of the desktop screen. In response to a user input related to the visual object 1730, the electronic device 101-1 may output the UI 1720 identified from the second application in the external display 310.

Figure 20:
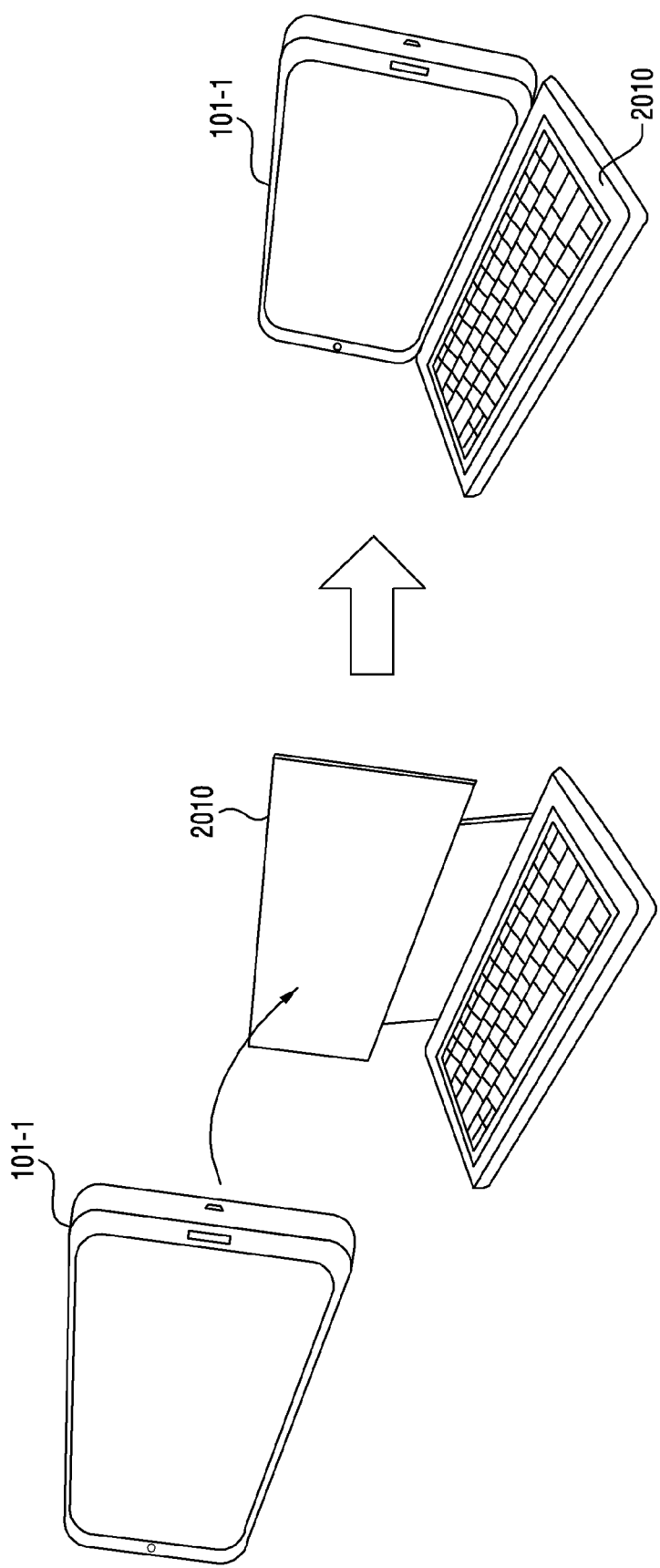
FIG. 20 is a diagram of coupling a keyboard device to an electronic device, according to an embodiment.

FIG. 20 is a diagram of coupling a keyboard device to an electronic device, according to an embodiment. The electronic device 101-1 of FIG. 20 may correspond to the electronic device 101 of FIG. 1 and FIGS. 3A and 3B. The electronic device 101-1 of FIG. 20 may correspond to, for example, a smart pad or a tablet PC.

Referring to FIG. 20, the keyboard device 2010 may be an accessory device for assisting with the functions of the electronic device 101-1. The keyboard device 2010 may include a fixing means (e.g., a magnet, a clip) for coupling to the electronic device 101-1. When the user couples the keyboard device 2010 and the electronic device 101-1 to each other, the electronic device 101-1 may execute an event corresponding to the coupling of the keyboard device 2010. The event may include an event for changing the operation mode of the electronic device 101-1. When the user couples the keyboard device 2010 and the electronic device 101-1 to each other, the electronic device may change the operation mode from the touch mode to the desktop mode. When the operation mode is changed from the touch mode to the desktop mode, a UI outputted in the display of the electronic device 101-1 (e.g., a home screen identified from the operating system, a UI identified from a running application) may be changed from a UI based on the touch mode to a UI based on the desktop mode.

Figure 21:
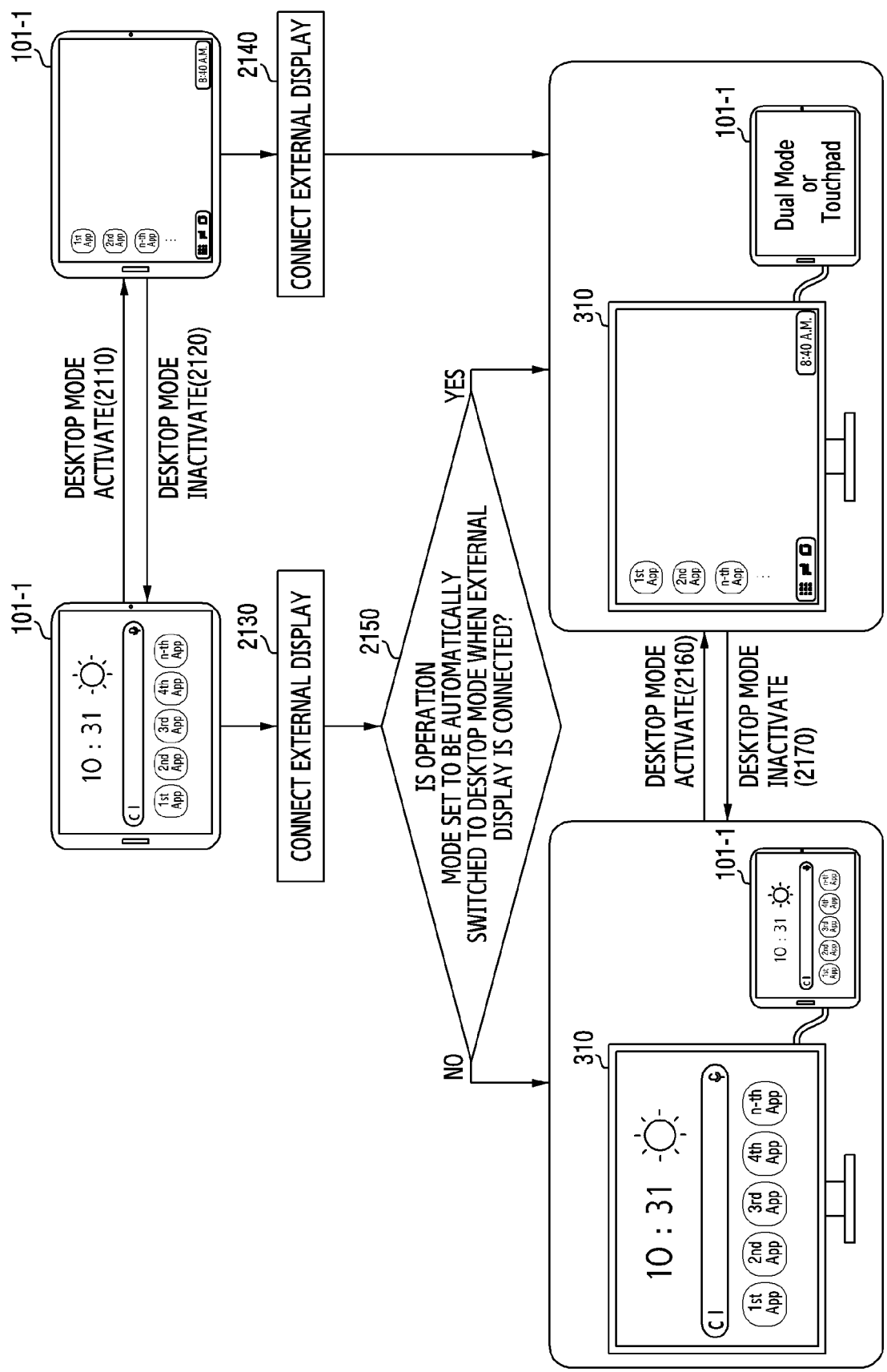
FIG. 21 is a flowchart of a method performed when an electronic device is connected with an external display, according to an embodiment.

FIG. 21 is a flowchart of a method performed when an electronic device is connected with an external display, according to an embodiment.

Referring to FIG. 21, the electronic device 101-1 may switch the operation mode between the touch mode and the desktop mode based on a user input (2110, 2120). When the user connects the external display 310 to the electronic device 101-1 operating in the touch mode (2130), the electronic device 101-1 may determine whether the operation mode is set to be automatically switched to the desktop mode in response to the connection with the external display 310.

When the operation mode is set to be automatically switched to the desktop mode in response to the connection with the external display 310, the electronic device 101-1 may determine an image to be outputted to the external display 310 based on the desktop mode. The electronic device 101-1 may independently obtain an image to be outputted to the external display 310 and an image to be outputted to the display of the electronic device 101-1.

When the operation mode is not set to be automatically switched to the desktop mode in response to the connection with the external display 310, the electronic device 101-1 may determine an image to be outputted to the external display 310 based on a mirroring mode. The electronic device may determine an image scaled from an image to be outputted to the display of the electronic device 101-1 as an image to be outputted to the external display 310. Even after the electronic device 101-1 and the external display 310 are connected with each other, the user may switch the operation mode of the electronic device 101-1 between the touch mode and the desktop mode (2160, 2170).

When the user connects the external display 310 to the electronic device 101-1 operating in the desktop mode (2140), the electronic device 101-1 may determine an image to be outputted to the external display 310 based on the desktop mode. The electronic device 101-1 may independently obtain an image to be outputted to the external display 310 and an image to be outputted to the display of the electronic device 101-1.

Figure 22:
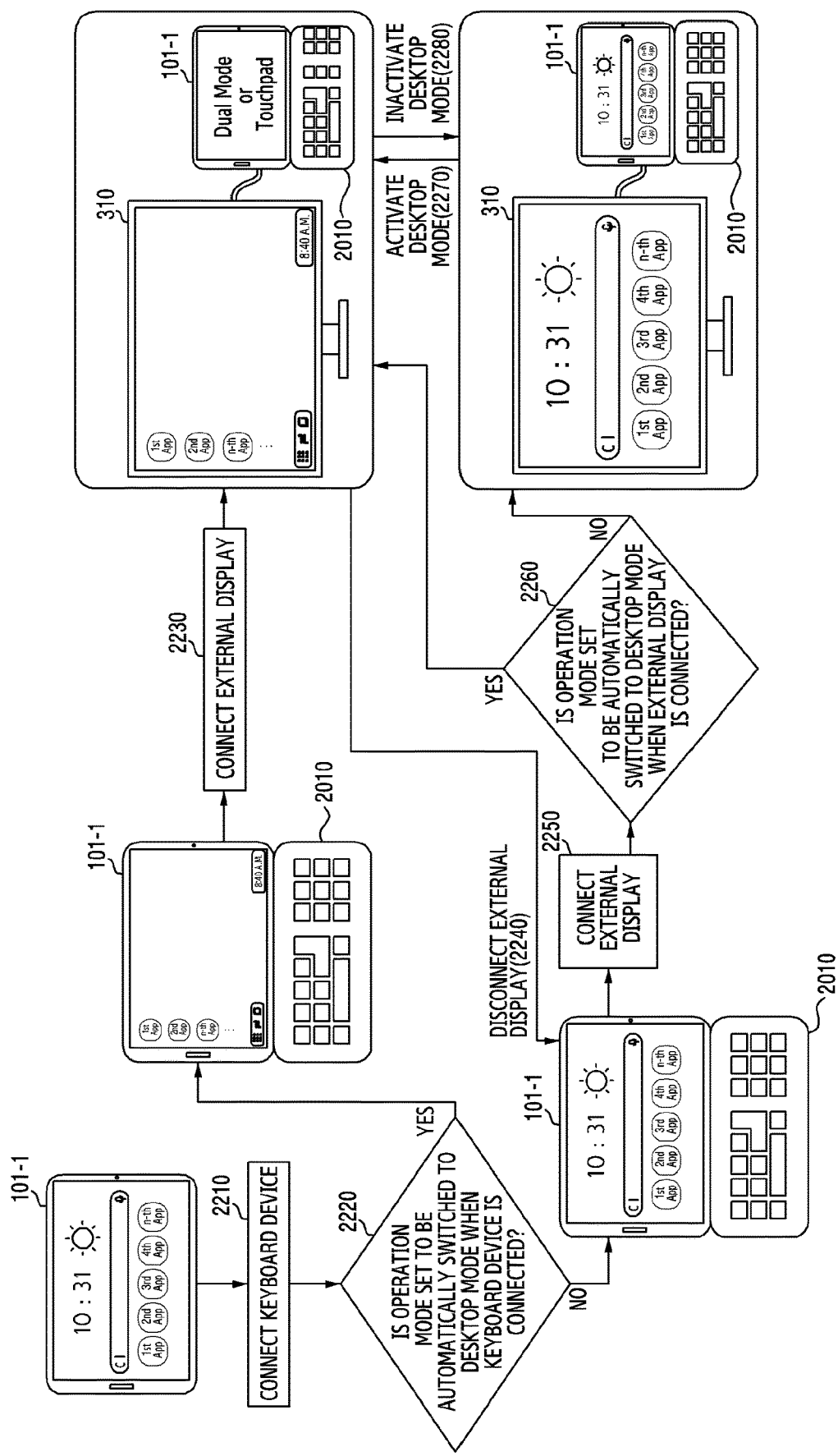
FIG. 22 is a flowchart of a method performed when an electronic device is connected with a keyboard device and an external display, according to an embodiment.

FIG. 22 is a flowchart of a method performed when an electronic device is connected with a keyboard device and an external display, according to an embodiment.

When the user connects the keyboard device 2010 to the electronic device 101-1 (2210), the electronic device 101-1 may determine whether the operation mode of the electronic device 101-1 is set to be automatically switched to the desktop mode in response to the connection with the keyboard device 2010 (2220). When the operation mode of the electronic device 101-1 is set to be automatically switched to the desktop mode, the electronic device 101-1 may output a UI based on the desktop mode in the display of the electronic device 101-1. When the operation mode of the electronic device 101-1 is not set to be automatically switched to the desktop mode, the electronic device 101-1 may continue outputting the UI based on the touch mode in the display of the electronic device 101-1.

When the user connects the external display 310 to the electronic device 101-1 automatically switched to the desktop mode (2230), the electronic device 101-1 may determine an image to be outputted to the external display 310 based on the desktop mode. The electronic device 101-1 may independently obtain an image to be outputted to the external display 310 and an image to be outputted to the display of the electronic device 101-1. When the user disconnects the external display 310 from the electronic device 101-1 (2240), the electronic device 101-1 may be changed back to the touch mode. Even after the electronic device 101-1 and the external display 310 are connected to each other, the user may switch the operation mode of the electronic device 101-1 between the touch mode and the desktop mode (2270, 2280).

When the user connects the external display 310 to the electronic device 101-1 which is connected with the keyboard device 2010 and operates in the touch mode (2250), the electronic device 101-1 may determine whether the operation mode of the electronic device 101-1 is set to be automatically switched to the desktop mode in response to the connection with the external display 310 (2260). When the operation mode of the electronic device 101-1 is set to be automatically switched to the desktop mode in response to the connection with the external display 310, the electronic device 101-1 may determine an image to be outputted to the external display 310 based on the desktop mode. When the operation mode of the electronic device 101-1 is not set to be automatically switched to the desktop mode in response to the connection with the external display 310, the electronic device 101-1 may determine an image to be outputted to the external display 310 based on the mirroring mode. The electronic device 101-1 may determine an image scaled from an image to be outputted to the display of the electronic device 101-1 as an image to be outputted to the external display 310.

The electronic device may output an image different from an image outputted in the display of the electronic device to the external display connected thereto. Accordingly, even when the display of the electronic device and the external display are different in their sizes or aspect ratios, an image outputted by the external display may not be distorted.

Since different applications or different UIs are outputted in the external display and the display of the electronic device, the user may use the external display and the display of the electronic device for different purposes.

The effects achieved by the disclosure are not limited to those mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a LAN, a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a first display;
    a sensor configured to detect a user input;
    a memory configured to store an application; and
    a processor operatively coupled to the first display, the sensor and the memory, wherein the processor is configured to:
    execute a first application and display, on the first display, a first user interface which is identified from the first application and including a partial region of a multimedia content;
    in response to a connection between an external device having a second display different from the first display and the electronic device, control the electronic device and the external device together by the first application such that the first application causes the second display to display a second user interface that includes an entire region of the multimedia content while the first display of the electronic device displays the partial region of the multimedia content;
    in response to detecting a first user input on the first user interface, change, by the first application, the displayed partial region of the multimedia content in the first user interface and change, by the first application, the displayed entire region of the multimedia content in the second user interface by changing a part of the entire region of the multimedia content displayed in the second user interface such that the changed part of the entire region of the multimedia content displayed in the second user interface corresponds to the changed partial region of the multimedia content displayed in the first user interface;
    in response to detecting a second user input on the first user interface, change, by the first application, a first magnification of the partial region of the multimedia content in the first user interface while maintaining, by the first application, a second magnification of the entire region of the multimedia content in the second user interface; and
    display, on the second user interface, an object in which an area inside of the object includes content that is the same as the partial region of the multimedia content displayed in the first user interface,
    wherein a size of the object displayed in the second user interface changes in accordance with the first magnification of the partial region displayed in the first user interface such that (i) the size of the object displayed in the second user interface is increased in response to the second user input being a zoom out gesture performed on the partial region displayed in the first user interface, and (ii) the size of the object displayed in the second user interface is decreased in response to the second user input being a zoom in gesture performed on the partial region displayed in the first user interface.

2. The electronic device of claim 1, wherein the processor is further configured to:
    display, by the first application, at least one visual object for changing the displayed partial region of the multimedia content in the first user interface.

3. The electronic device of claim 1, wherein the processor is configured to:
    change, by the first application, the partial region of the multimedia content in the first user interface by displaying a first visual object corresponding to a path of the first user input in the first user interface; and
    change, by the first application, the entire region of the multimedia content in the second user interface by displaying a second visual object corresponding to the first visual object in the second user interface.

4. The electronic device of claim 1, wherein the processor is configured to:
    change, by the first application, the display of the first user interface by magnifying or reducing a part of the partial region of the multimedia content displayed in the first user interface.

5. The electronic device of claim 1, wherein the processor is configured to:
    change, by the first application, the display of the first user interface by moving the partial region of the multimedia content displayed in the first user interface such that another partial region of the multimedia content is displayed in the first user interface.

6. The electronic device of claim 1, wherein the processor is configured to:
change, by the first application, the display of the first user interface by rotating the partial region of the multimedia content displayed in the first user interface.

7. The electronic device of claim 1, wherein the processor is further configured to:
highlight, by the first application, a part of the entire region of the multimedia content in the second user interface, the highlighted part of the entire region of the multimedia content corresponding to the partial region of the multimedia content displayed, by the first application, in the first user interface.

8. The electronic device of claim 1, further comprising a communication circuit,
wherein the processor is further configured to:
in response to receiving a message related to a second application different from the first application through the communication circuit, display a first visual object corresponding to the message on the first display and display a second visual object corresponding to the message on the second display;
in response to detecting a third user input on the first visual object, change the first user interface displayed on the first display to a third user interface identified from the second application while maintaining the display of the second user interface; and
in response to detecting a fourth user input on the second visual object, change the second user interface displayed on the second display to a fourth user interface identified from the second application while maintaining the display of the first user interface.

9. The electronic device of claim 8, wherein the processor is further configured to:
in response to the first user interface being changed to the third user interface, shift a focus from the first application to the second application;
in response to detecting a fifth user input on the second user interface displayed on the second display after the focus is shifted from the first application to the second application, shift the focus from the second application to the first application;
in response to the second user interface being changed to the fourth user interface, shift the focus from the first application to the second application; and
in response to detecting a sixth user input on the first user interface displayed on the first display after the focus is shifted from the first application to the second application, shift the focus from the second application to the first application.

10. The electronic device of claim 1, wherein the first application is included in a database comprising a list of at least one application supporting changing of a size of a user interface among a plurality of applications installed in the electronic device.

11. A method for operating an electronic device, the method comprising:
executing a first application and displaying, on a first display of the electronic device, a first user interface which is identified from the first application and including a partial region of a multimedia content;
in response to a connection between an external device having a second display different from the first display and the electronic device, controlling the electronic device and the external device together by the first application such that the first application causes the second display to display a second user interface that includes an entire region of the multimedia content while the first display of the electronic device displays the partial region of the multimedia content;
in response to detecting a first user input on the first user interface, changing, by the first application, the displayed partial region of the multimedia content in the first user interface and changing, by the first application, the displayed entire region of the multimedia content in the second user interface by changing a part of the entire region of the multimedia content displayed in the second user interface such that the changed part of the entire region of the multimedia content displayed in the second user interface corresponds to the changed partial region of the multimedia content displayed in the first user interface;
in response to detecting a second user input on the first user interface, changing, by the first application, a first magnification of the partial region of the multimedia content in the first user interface while maintaining, by the first application, a second magnification of the entire region of the multimedia content in the second user interface; and
displaying, on the second user interface, an object in which an area inside of the object includes content that is the same as the partial region of the multimedia content displayed in the first user interface; and
changing a size of the object displayed in the second user interface changes in accordance with the first magnification of the partial region displayed in the first user interface such that (i) the size of the object displayed in the second user interface is increased in response to the second user input being a zoom out gesture performed on the partial region displayed in the first user interface, and (ii) in the size of the object displayed in the second user interface is decreased in response to the second user input being a zoom in gesture performed on the partial region displayed in the first user interface.

12. The method of claim 11, further comprising:
displaying, by the first application, at least one visual object for changing the displayed partial region of the multimedia content in the first user interface.

13. The method of claim 11, wherein changing of the displayed partial region of the multimedia content in the first user interface comprises displaying, by the first application a first visual object corresponding to a path of the first user input in the first user interface; and
wherein changing of the displayed entire region of the multimedia content in the second user interface comprises displaying, by the first application, a second visual object corresponding to the first visual object in the second user interface.

14. The method of claim 11, wherein changing of the display of the first user interface comprises magnifying or reducing, by the first application, a part of the partial region of the multimedia content displayed in the first user interface.

15. The method of claim 11, wherein changing of the display of the first user interface comprises moving, by the first application, the partial region of the multimedia content displayed in the first user interface such that another partial region of the multimedia content is displayed in the first user interface.

16. The method of claim 11, wherein changing of the display of the first user interface comprises rotating, by the first application, the partial region of the multimedia content displayed in the first user interface.

17. The method of claim 11, further comprising:
highlighting, by the first application, a part of the entire region of the multimedia content in the second user interface, the highlighted part of the entire region of the multimedia content corresponding to the partial region of the multimedia content displayed, by the first application, in the first user interface.

18. The method of claim 11, further comprising:
in response to receiving a message related to a second application different from the first application through a communication circuit of the electronic device, displaying a first visual object corresponding to the message on the first display and displaying a second visual object corresponding to the message on the second display;
in response to detecting a third user input on the first visual object, changing the first user interface displayed on the first display to a third user interface identified from the second application while maintaining the display of the second user interface; and
in response to detecting a fourth user input on the second visual object, changing the second user interface displayed on the second display to a fourth user interface identified from the second application while maintaining the display of the first user interface.

19. The method of claim 18, further comprising:
in response to the first user interface being changed to the third user interface, shifting a focus from the first application to the second application;
in response to detecting a fifth user input on the second user interface displayed on the second display after the focus is shifted from the first application to the second application, shifting the focus from the second application to the first application;
in response to the second user interface being changed to the fourth user interface, shifting the focus from the first application to the second application; and
in response to detecting a sixth user input on the first user interface displayed on the first display after the focus is shifted from the first application to the second application, shifting the focus from the second application to the first application.

20. The method of claim 11, wherein the first application is included in a database comprising a list of at least one application supporting changing of a size of a user interface among a plurality of applications installed in the electronic device.

* * * * *